(12) United States Patent
Mishra

(10) Patent No.: US 12,033,445 B1
(45) Date of Patent: Jul. 9, 2024

(54) SYSTEMS AND METHODS FOR CAUSAL DETECTION AND DIAGNOSIS OF VEHICLE FAULTS

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 521 days.

(21) Appl. No.: 17/113,707

(22) Filed: Dec. 7, 2020

(51) Int. Cl.
| | |
|---|---|
| G07C 5/08 | (2006.01) |
| B64C 39/02 | (2023.01) |
| B64U 101/00 | (2023.01) |
| G06F 18/214 | (2023.01) |
| G06F 18/23 | (2023.01) |
| G06N 20/00 | (2019.01) |

(52) U.S. Cl.
CPC .......... *G07C 5/0816* (2013.01); *B64C 39/024* (2013.01); *G06F 18/214* (2023.01); *G06F 18/23* (2023.01); *G06N 20/00* (2019.01); *G07C 5/0808* (2013.01); *G07C 5/0841* (2013.01); *B64U 2101/00* (2023.01)

(58) Field of Classification Search
CPC .. G07C 5/0816; G07C 5/0808; B64C 39/024; G06F 18/214; G06F 18/23; G06N 20/00; B64U 2101/00
See application file for complete search history.

(56) References Cited

U.S. PATENT DOCUMENTS

| | | | |
|---|---|---|---|
| 10,053,236 B1 * | 8/2018 | Buchmueller | G01N 29/14 |
| 2020/0285997 A1 * | 9/2020 | Bhattacharyya | G06N 7/01 |
| 2021/0101607 A1 * | 4/2021 | Du | G07C 5/0808 |
| 2021/0325888 A1 * | 10/2021 | Mandel-Senft | G01S 17/89 |
| 2022/0126864 A1 * | 4/2022 | Moustafa | B60W 50/00 |

OTHER PUBLICATIONS

Dec. 23, 2022 office action for U.S. Appl. No. 17/118,530. (Year: 2022).*

(Continued)

*Primary Examiner* — Peter D Nolan
*Assistant Examiner* — Tanya C Sienko
(74) *Attorney, Agent, or Firm* — Athorus, PLLC

(57) ABSTRACT

Described are systems and methods relating to the causal detection and diagnosing of faults and anomalous operation of autonomous vehicles, such as unmanned aerial vehicles (UAVs), using machine learning. Embodiments of the present disclosure can provide systems and methods for detecting and diagnosing faults based on comparisons between the measured operation and/or behavior of a vehicle to the vehicle's expected nominal operation and/or behavior. Accordingly, the systems and methods according to embodiments of the present disclosure do not require prior knowledge of faults or modeling of the vehicle, the vehicle's operation, and/or environmental uncertainties. Further, embodiments of the present disclosure can facilitate sequencing of a vehicle's faults and/or anomalous operation and/or behavior, identify dependencies between a vehicle's faults and/or anomalous operation and/or behavior, and can detect and diagnose faults and/or anomalous operation and/or behavior in a contextual manner.

18 Claims, 13 Drawing Sheets

(56) References Cited

OTHER PUBLICATIONS

"A Study of Fault Detection and System Reconfiguration for UAV Navigation System Based on RBF Neural Network" D. Yuan et al., Proceedings of the 7th World Congress on Intelligent Control and Automation Jun. 25-27, 2008, Chongqing, China (Year: 2008).*
"Opprentice: Towards Practical and Automatic Anomaly Detection Through Machine Learning" D. Liu, et al. IMC'15, Oct. 28-30, 2015, Tokyo, Japan. (Year: 2015).*
"Addressing the state explosion problem when visualizing off-nominal behaviors in a set of reactive requirements" D. Aceituna et al, Requirements Eng (2019) 24:161-180 (Year: 2019).*
"On-board Deep-learning-based Unmanned Aerial Vehicle Fault Cause Detection and Identification" V. Sadhu et al. pp. 5255-5261, 2020 IEEE International Conference on Robotics and Automation (ICRA) May 31-Aug. 31, 2020. Paris, France (Year: 2020).*
"Probability concepts explained: Marginalisation", J. Brooks-Bartlett, downloaded off Towards Data Science website: www.towardsdatascience.com/probability-concepts-explained-marginalisation-2296846344fc (Year: 2018).*

\* cited by examiner

Flight Number 10

| Component | Value | Status | Possible Cause(s) |
|---|---|---|---|
| Motor 0 | 0, 1.947 | ✓ | N/A |
| Motor 1 | -1.425, 1.197 | ⚠ | Failing motor; failing relay; failing motor mount |
| Control Surface 0 | 2.39 | ✓ | |
| Control Surface 1 | 2.41 | ✓ | |
| Payload Door | 0.983 | ⚠ | Failing actuator, unsecured payload |
| ... | ... | ... | ... |

FIG. 7

SYSTEMS AND METHODS FOR CAUSAL DETECTION AND DIAGNOSIS OF VEHICLE FAULTS

BACKGROUND

Autonomous vehicles, such as unmanned aerial vehicles ("UAVs"), ground and water based automated vehicles, etc., are continuing to increase in use. However, detecting and/or diagnosing faults in the operation of such autonomous vehicles can be difficult. For example, many autonomous vehicles may automatically alter and/or adjust its behavior and/or operation in response to anomalous behavior and/or operation and to compensate for the anomalous behavior and/or operation. Accordingly, the compensation measures performed by the autonomous vehicles can mask or hide the anomalous behavior and/or operation. Further, traditional fault detection and diagnosis methods, such as failure modes, effects and criticality analyses (FMECA) and fault tree analyses (FTA) often require prior knowledge of the faults to employ forecasting and/or prediction algorithms. Accordingly, these known methods are typically unable to detect, isolate, and diagnose unknown faults. Further, FMECA and FTA are typically inefficient and error prone.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 7 is an illustration of an exemplary presentation of a fault condition report, according to exemplary embodiments of the present disclosure.

Figure 1:
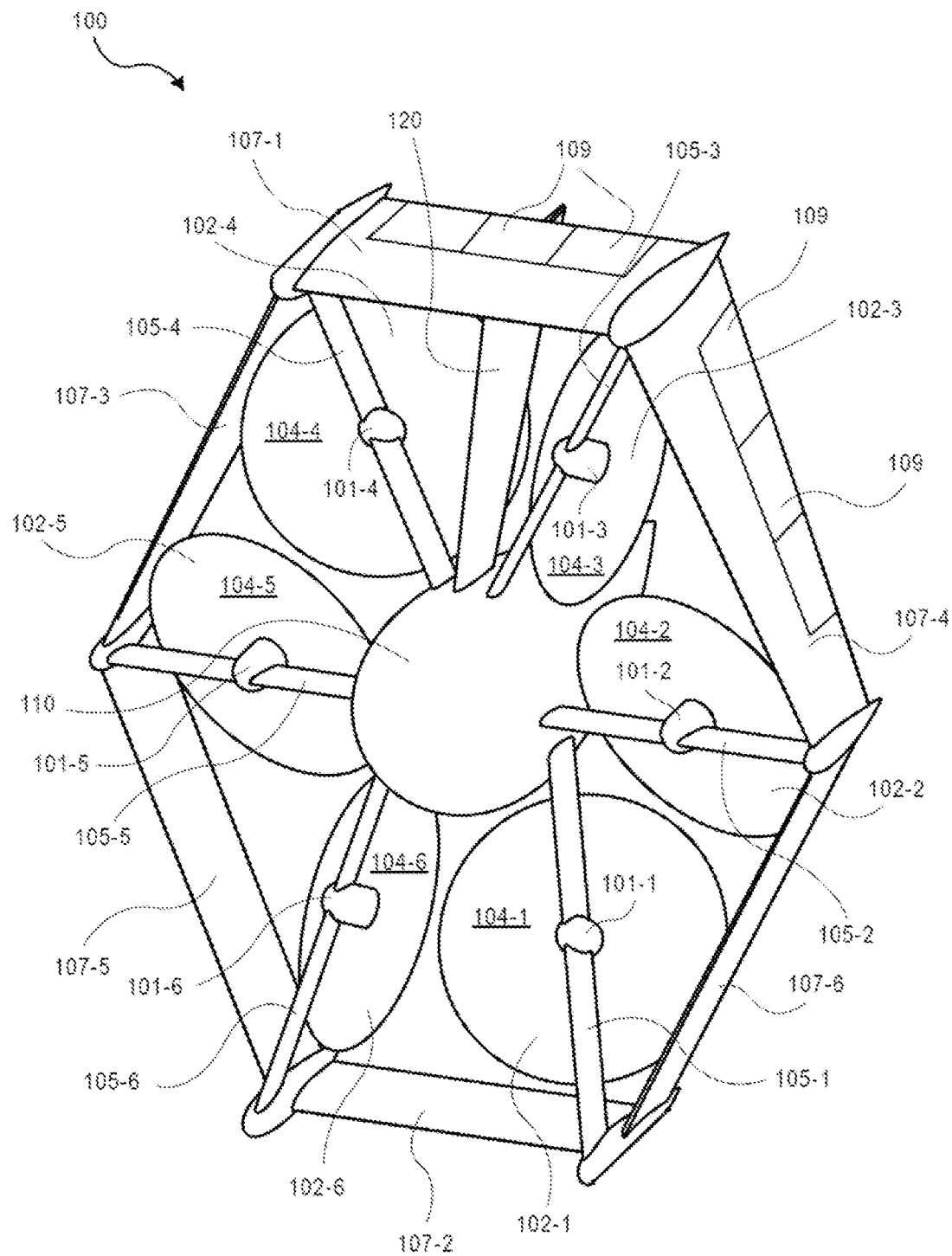
FIG. 1 is an illustration of an exemplary aerial vehicle, according to exemplary embodiments of the present disclosure.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

As is set forth in greater detail below, embodiments of the present disclosure are generally directed to systems and methods for detecting and diagnosing faults and anomalous operation of autonomous vehicles, such as unmanned aerial vehicles (UAVs), using machine learning. Specifically, embodiments of the present disclosure can provide systems and methods for detecting and diagnosing faults based on comparisons between the measured operation and/or behavior of a vehicle to the vehicle's expected nominal operation and/or behavior. Accordingly, the systems and methods according to embodiments of the present disclosure do not require prior knowledge of faults or modeling the vehicle, the vehicle's operation, and/or environmental uncertainties. Further, embodiments of the present disclosure can facilitate sequencing of a vehicle's faults and/or anomalous operation and/or behavior, identify dependencies between a vehicle's faults and/or anomalous operation and/or behavior, and can detect and diagnose faults and/or anomalous operation and/or behavior in a contextual manner.

Embodiments of the present disclosure can provide systems and methods that can detect, identify, and diagnose faults and/or anomalous operation and/or behavior of a vehicle, as well as determine the cause underlying the faults and/or anomalous operation and/or behavior of the vehicle. Specifically, the faults and/or anomalous operation and/or behavior of a vehicle can be identified by comparing the measured and observed behavior and/or operation of a vehicle during a mission against expected nominal behavior and/or operation of the vehicle. For example, a machine learning system can be trained to identify deviations from the expected nominal behavior and/or operation of the vehicle as anomalous residuals. Further, the identification of anomalous residuals can be performed in a contextual manner. After one or more anomalous residuals have been identified, each anomalous residual can be compared against a threshold error bound to determine whether the anomalous residual is a fault condition or is within an acceptable range.

For anomalous residuals that are determined to lie outside the threshold error bound and determined to be a fault condition, aspects of the present disclosure can determine one or more underlying causes associated with the anomalous residual. For example, a further trained machine learning system can determine one or more underlying causes that may have resulted in the fault condition. The trained machine learning system may have been trained to predict the most likely causes underlying the identified fault condition. Further, the trained machine learning system may also identify the progression of fault conditions and/or anomalous residuals over time, patterns in fault conditions and/or anomalous residuals, relationships and/or dependencies among and between certain fault conditions and/or anomalous residuals, etc.

Embodiments of the present disclosure can also provide training of the one or more trained machine learning systems, such as a residuals generator and a causal engine, which can be employed to detect, identify, and diagnose the fault conditions and/or anomalous operation and/or behavior of a vehicle and determine the cause underlying the faults and/or anomalous operation and/or behavior. According to certain aspects of the present disclosure, a residuals generator can be trained to detect and/or identify faults and/or anomalous operation and/or behavior of a vehicle. The residuals generator can be trained, for example, using vehicle data and/or information (e.g., vehicle logs, event logs, etc.) obtained from multiple missions performed by multiple vehicles having the same concept of operations (CONOPS), while being performed at substantially the same time, in substantially the same environment, etc. as training inputs to the one or more machine learning systems. At least one of the multiple missions can correspond to a mission performed to represent the expected nominal behavior and/or operation of the vehicle. Accordingly, the various vehicle data and/or information, including the vehicle data and/or information associated with the mission representing the expected nominal behavior and/or operation of the vehicle can be provided as training inputs to the machine learning system such that the machine learning system can be trained to identify anomalous residuals in the vehicle data and/or information that are provided as inputs to the trained residuals generator. Further, embodiments of the present disclosure can also provide training of a causal engine that can determine one or more causes underlying and/or associated with an identified fault condition and/or anomalous residual.

Further, although embodiments of the present disclosure are described primarily with respect to autonomous aerial vehicles, embodiments of the present disclosure can be applicable to any other types of autonomous vehicles. For example, embodiments of the present disclosure can be applicable to unmanned aerial vehicles, ground-based vehicles, autonomous ground-based vehicles, water-based vehicles, unmanned water-based vehicles, etc.

FIG. 1 illustrates an exemplary aerial vehicle 100, according to exemplary embodiments of the present disclosure.

As shown in FIG. 1, aerial vehicle 100 can include a ring wing that is substantially hexagonal in shape and that surrounds a plurality of propulsion mechanisms, according to disclosed implementations. Aerial vehicle 100 includes six propulsion mechanisms 102-1, 102-2, 102-3, 102-4, 102-5, and 102-6 spaced about fuselage 110 of aerial vehicle 100. As discussed above, while propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as propulsion mechanisms 102. For example, one or more of propulsion mechanisms 102 of aerial vehicle 100 may utilize fans, jets, turbojets, turbo fans, jet engines, and/or the like to maneuver the aerial vehicle. Generally described, propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween).

In this implementation, aerial vehicle 100 also includes ring wing 107 having a substantially hexagonal shape that extends around and forms the perimeter of the aerial vehicle 100. In the illustrated example, ring wing 107 has six sections or segments 107-1, 107-2, 107-3, 107-4, 107-5, and 107-6 that are joined at adjacent ends to form ring wing 107 around aerial vehicle 100. Each segment of ring wing 107 has an airfoil shape to produce lift when the aerial vehicle is oriented as illustrated in FIG. 1 and moving in a direction that is substantially horizontal. As illustrated, and discussed further below, ring wing 107 is positioned at an angle with respect to fuselage 110 such that lower segment 107-2 of ring wing 107 acts as a front wing as it is toward the front of aerial vehicle 100 when oriented as shown and moving in a horizontal direction. Upper segment 107-1 of ring wing 107, which has a longer chord length than lower segment 107-2 of ring wing 107, is farther back and thus acts as a rear wing.

Ring wing 107 is secured to fuselage 110 by motor arms 105. In this example, all six motor arms 105-1, 105-2, 105-3, 105-4, 105-5, and 105-6 are coupled to the fuselage at one end, extend from fuselage 110 and couple to ring wing 107 at a second end, thereby securing ring wing 107 to fuselage 110. In other implementations, less than all of the motor arms may extend from fuselage 110 and couple to ring wing 107. For example, motor arms 105-2 and 105-5 may be coupled to fuselage 110 at one end and extend outward from fuselage 110 but not couple to ring wing 107.

In some implementations, aerial vehicle 100 may also include one or more stabilizer fins 120 that extend from fuselage 110 to ring wing 107. Stabilizer fin 120 may also have an airfoil shape. In the illustrated example, stabilizer fin 120 extends vertically from fuselage 110 to ring wing 107. In other implementations, stabilizer fin 120 may be at other positions. For example, stabilizer fin 120 may extend downward from fuselage 110 between motor arm 105-1 and motor arm 105-6.

In general, one or more stabilizer fins may extend from fuselage 110, between any two motor arms 105 and couple to an interior of ring wing 107. For example, stabilizer fin 120 may extend upward between motor arms 105-3 and 105-4, a second stabilizer fin may extend from fuselage 110 and between motor arms 105-5 and 105-6, and a third stabilizer fin may extend from fuselage 110 and between motor arms 105-1 and 105-2.

Likewise, while the illustrated example shows motor arms 105 extending from fuselage 110 at one end and coupling to the interior of ring wing 107 at a second end, in other implementations, one or more of motor arm(s) 105 may extend from the fuselage and not couple to ring wing 107 or may extend from ring wing 107 and not couple to fuselage 110. In some implementations, one or more motor arm(s) 105 may extend from the exterior of ring wing 107, one or more motor arm(s) 105 may extend from the interior of ring wing 107, one or more motor arm(s) 105 may extend from fuselage 110, and/or one or more motor arm(s) 105 may extend from fuselage 110 and couple to the interior of ring wing 107.

Fuselage 110, motor arms 105, stabilizer fin 120, and ring wing 107 of the aerial vehicle 100 may be formed of any one or more suitable materials, such as graphite, carbon fiber, and/or aluminum.

Each of propulsion mechanisms 102 are coupled to a respective motor arm 105 (or propulsion mechanism arm) such that propulsion mechanism 102 is substantially contained within the perimeter of ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between fuselage 110 and ring wing 107. In other implementations, some propulsion mechanisms 102 may be coupled toward an end of the respective motor arm 105. In other implementations, propulsion mechanisms 102 may be coupled at other locations along the motor arm. Likewise, in some implementations, some of propulsion mechanisms 102 may be coupled to a mid-point of the motor arm and some of propulsion mechanisms 102 may be coupled at other locations along respective motor arms (e.g., closer toward the fuselage 110 or closer toward the ring wing 107).

As illustrated, propulsion mechanisms 102 may be oriented at different angles with respect to each other. For example, propulsion mechanisms 102-2 and 102-5 are aligned with fuselage 110 such that the force generated by each of propulsion mechanisms 102-2 and 102-5 is in-line or in the same direction or orientation as fuselage 110. In the illustrated example, aerial vehicle 100 is oriented for horizontal flight such that fuselage 110 is oriented horizontally in the direction of travel. In such an orientation, propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When aerial vehicle 100 is oriented horizontally as shown in FIG. 1 for horizontal flight, propulsion mechanisms 102-1, 102-3, 102-4, and 102-6 may be used as propulsion mechanisms, providing thrust in a non-horizontal direction to cause aerial vehicle 100 to pitch, yaw, roll, heave and/or sway. In other implementations, during horizontal flight, propulsion mechanisms 102-1, 102-3, 102-4, and 102-6 may be disabled such that they do not produce any forces and aerial vehicle 100 may be propelled aerially in a horizontal direction as a result of the lifting force from the aerodynamic shape of ring wing 107 and the horizontal thrust produced by the thrusting propulsion mechanisms 102-2 and 102-5.

In some implementations, one or more segments of ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. Ailerons, control surfaces, and/or trim tabs 109 may be operable to control the pitch, yaw, and/or roll of the aerial vehicle during horizontal flight when aerial vehicle 100 is oriented as illustrated in FIG. 1.

The angle of orientation of each of propulsion mechanisms 102-1, 102-2, 102-3, 102-4, 102-5, and 102-6 may vary for different implementations. Likewise, in some implementations, the offset of propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about second motor arm 105-2 and oriented toward propulsion mechanism 102-3. Finally, propulsion mechanism 102-4 is oriented approximately thirty degrees in the first direction about fourth motor arm 105-4 and toward propulsion mechanism 102-5. As illustrated, propulsion mechanisms 102-2 and 102-5, which are on opposing sides of fuselage 110, are aligned and oriented in a same first direction (in this example, horizontal). Propulsion mechanisms 102-3 and 102-6, which are on opposing sides of fuselage 110, are aligned and oriented in a same second direction, which is angled compared to the first direction. Propulsion mechanisms 102-1 and 102-4, which are on opposing sides of fuselage 110, are aligned and oriented in a same third direction, which is angled compared to the first direction and the second direction.

Aerial vehicle 100 may also include a variety of sensors, such as imaging devices, an inertial measurement unit, accelerometers, gyroscopes, navigational sensors, thermal sensors, infrared sensors, laser sensors (e.g., LIDAR, etc.), pressure sensors, voltmeter, ammeters, or other sensors to facilitate autonomous operation and/or navigation of aerial vehicle 100. For example, the various sensors may continuously monitor the operation of the various systems and components of aerial vehicle 100, as well as external operational conditions, such as the environment, weather, etc. Accordingly, operation and/or navigation of aerial vehicle 100 may be determined based on data and information measured and recorded by the various sensors, as well as data and information associated with a flight plan, one or more flight controllers, etc. Further, the various sensors may provide and/or receive data and information to/from one or more flight controllers of aerial vehicle 100 to facilitate adjustment and control of the various control surfaces, motors, etc. to facilitate operation and/or navigation of aerial vehicle 100. The sensors may also detect changes to flight operations or navigation of the aerial vehicle that may be caused by environmental conditions, fault conditions, or other conditions.

Figure 2:
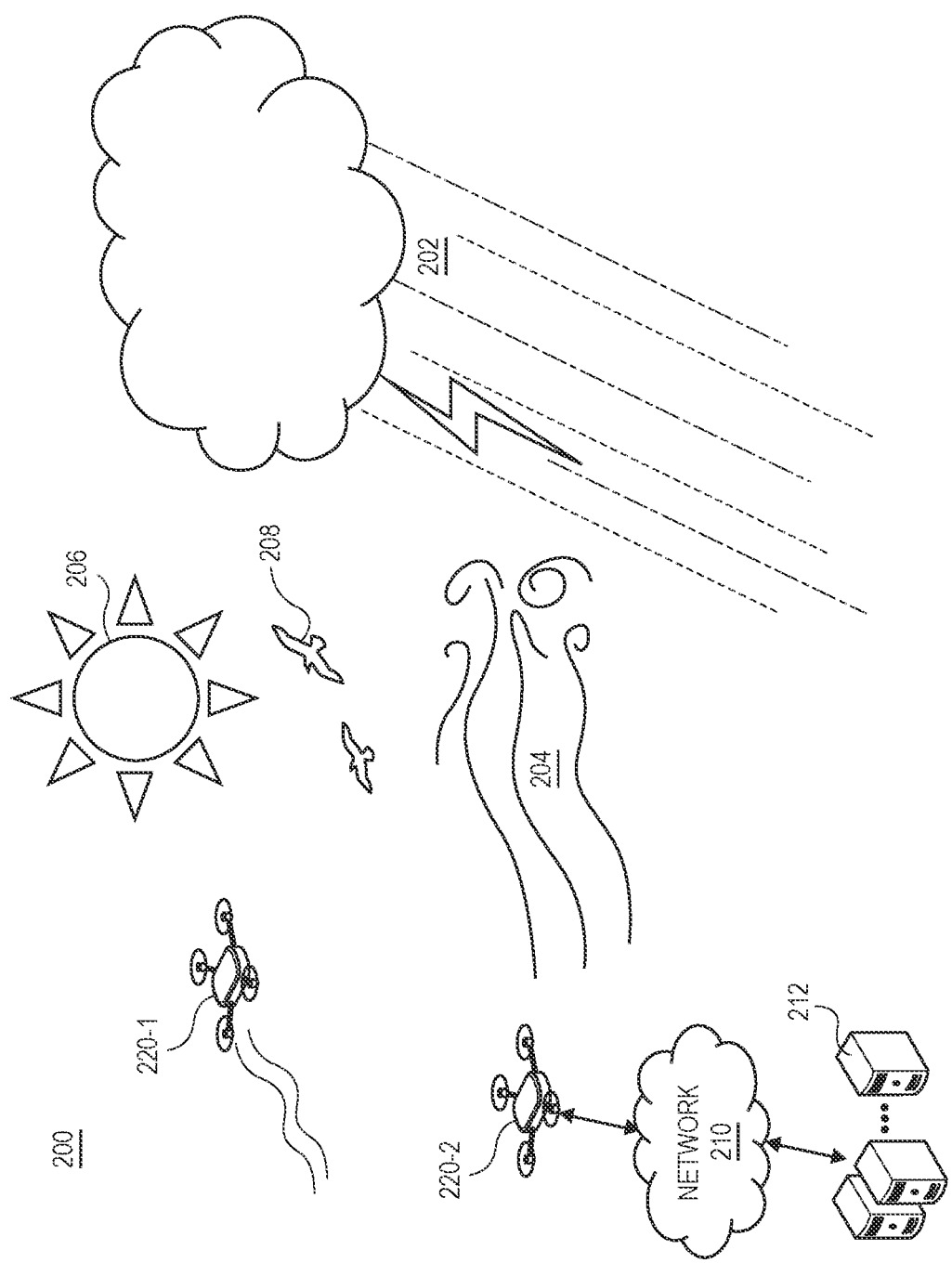
FIG. 2 is an illustration of an exemplary environment in which unmanned aerial vehicles may operate, according to exemplary embodiments of the present disclosure.

FIG. 2 is an illustration of an exemplary environment 200 in which unmanned aerial vehicles may operate, according to exemplary embodiments of the present disclosure. According to certain exemplary embodiments, aerial vehicle 220-1 and/or aerial vehicle 220-2, as shown in FIG. 2, may include aerial vehicle 100 as shown and described in connection with FIG. 1.

As shown in FIG. 2, aerial vehicle 220-1 and aerial vehicle 220-2 may be operating and/or navigating in environment 200 for the performance of various missions. For example, aerial vehicle 220-1 and/or aerial vehicle 220-2 may be delivering packages or other items, navigating from an origin to a destination, taking images or videos of an area, surveying or performing other surveillance of an area, or performing other missions.

While navigating in environment 200, aerial vehicle 220-1 and/or aerial vehicle 220-2 may also be continuously measuring and perceiving certain parameters presented in environment 200 and in connection with the performance and/or operation of aerial vehicle 220-1 and/or aerial vehicle 220-2. For example, sensors, such as imaging devices, an inertial measurement unit, accelerometers, gyroscopes, navigational sensors, thermal sensors, infrared sensors, laser sensors (e.g., LIDAR, etc.), pressure sensors, voltmeter, ammeters, or other sensors, may be detecting, measuring, and/or recording data and information associated with environment 200 and the operation of aerial vehicle 220-1 and/or aerial vehicle 220-2. According to certain aspects of the present disclosure, aerial vehicle 220-1 and/or aerial vehicle 220-2 may be continuously measuring and/or recording data and/or information in connection with parameters associated with the environment (e.g., temperature, precipitation, relative humidity, wind, visibility, etc.) and the performance and operation of the various components and systems of aerial vehicle 220-1 and/or aerial vehicle 220-2, such as input voltages, input currents, temperatures, impedances, rotation rates of the motors, response of control surfaces, behavior of aerial vehicle 220-1 and/or aerial vehicle 220-2 in response to certain commands (e.g., motor settings, control surface settings, etc.), images, energy expenditure, as well as other parameters. The data and/or information may be measured and collected in connection with the vehicle's navigation system, sensors, control surfaces, motors, avionics, power source (e.g., battery, etc.), payload, the environment, etc., and may be recorded in a flight log, an event log, or the like that may be generated by aerial vehicle 220-1 and/or aerial vehicle 220-2. For example, aerial vehicle 220-1 and/or aerial vehicle 220-2 may generate flight logs, event logs, or the like to record various measured and sensed parameters associated with the operation and performance of aerial vehicle 220-1 and/or aerial vehicle 220-2 during operation and/or navigation of aerial vehicle 220-1 and/or aerial vehicle 220-2. Further, the data and/or information associated with parameters measured in connection with the environment can provide context for the data and/or information measured and recorded in connection with the performance and/or operation of aerial vehicle 220-1 and/or aerial vehicle 220-2.

Moreover, while navigating in environment 200, aerial vehicle 220-1 and/or aerial vehicle 220-2 may encounter various environmental conditions. For example, aerial vehicle 220-1 and/or aerial vehicle 220-2 may experience wind 204, obstacles 208, such as birds, power lines, other aerial vehicles, or other obstacles, adverse weather conditions 202 such as rain, snow, thunder, lightning, low visibility, or other adverse weather conditions, the wake from aerial vehicle 220-1, glare from sun 206, or other environmental conditions. Accordingly, aerial vehicle 220-1 and/or aerial vehicle 220-2 may continuously measure and record data and/or information parameters associated with environment 200 (e.g., presented by the various environmental conditions, etc.) and with the operation and performance of aerial vehicle 220-1 and/or aerial vehicle 220-2 while navigating in environment 200 and encountering one or more of the various environmental conditions. Further, the data and/or information obtained by the various sensors while navigating in environment 200 and encountering one or more of the various environmental conditions may also be recorded in vehicle logs, event logs, or the like that may be generated by aerial vehicle 220-1 and/or aerial vehicle 220-2.

As also shown in FIG. 2, aerial vehicle 220-1 and/or aerial vehicle 220-2 may be connected to server 212 via network 210. As shown in FIG. 2, aerial vehicle 220-1 and/or aerial vehicle 220-2 can operate in environment 200 and can access and communicate with server 212 (or other computer systems) via network 210. For example, network 210 can include any wired or wireless network (e.g., cellular, satellite, Bluetooth, Wi-Fi, etc.) that can facilitate communications between aerial vehicle 220-1 and/or aerial vehicle 220-2 and server 212. Server 212 can transmit data and other information, including one or more instructions and/or commands to aerial vehicle 220-1 and/or aerial vehicle 220-2 to allow aerial vehicle 220-1 and/or aerial vehicle 220-2 to operate in environment 200. Further, aerial vehicle 220-1 and/or aerial vehicle 220-2 may transmit and/or receive data and/or information associated with the performance and/or operation of aerial vehicle 220-1 and/or aerial vehicle 220-2. This may include vehicle data and/or information that may be contained in flight logs, event logs, or the like that may be generated and/or maintained by aerial vehicle 220-1 and/or aerial vehicle 220-2 during operation of aerial vehicle 220-1 and/or aerial vehicle 220-2.

FIGS. 3A-3E are block diagrams of an exemplary causal fault detection and diagnosis system 300, according to exemplary embodiments of the present disclosure. According to certain exemplary embodiments, a server, such as server 212, may operate and/or execute causal fault detection and diagnosis system 300. Alternatively and/or in addition, causal fault detection and diagnosis system 300 may be local to the vehicle (e.g., aerial vehicle 100, 220, etc.) for which causal fault detection and diagnosis system 300 is being used.

Figure 3A:
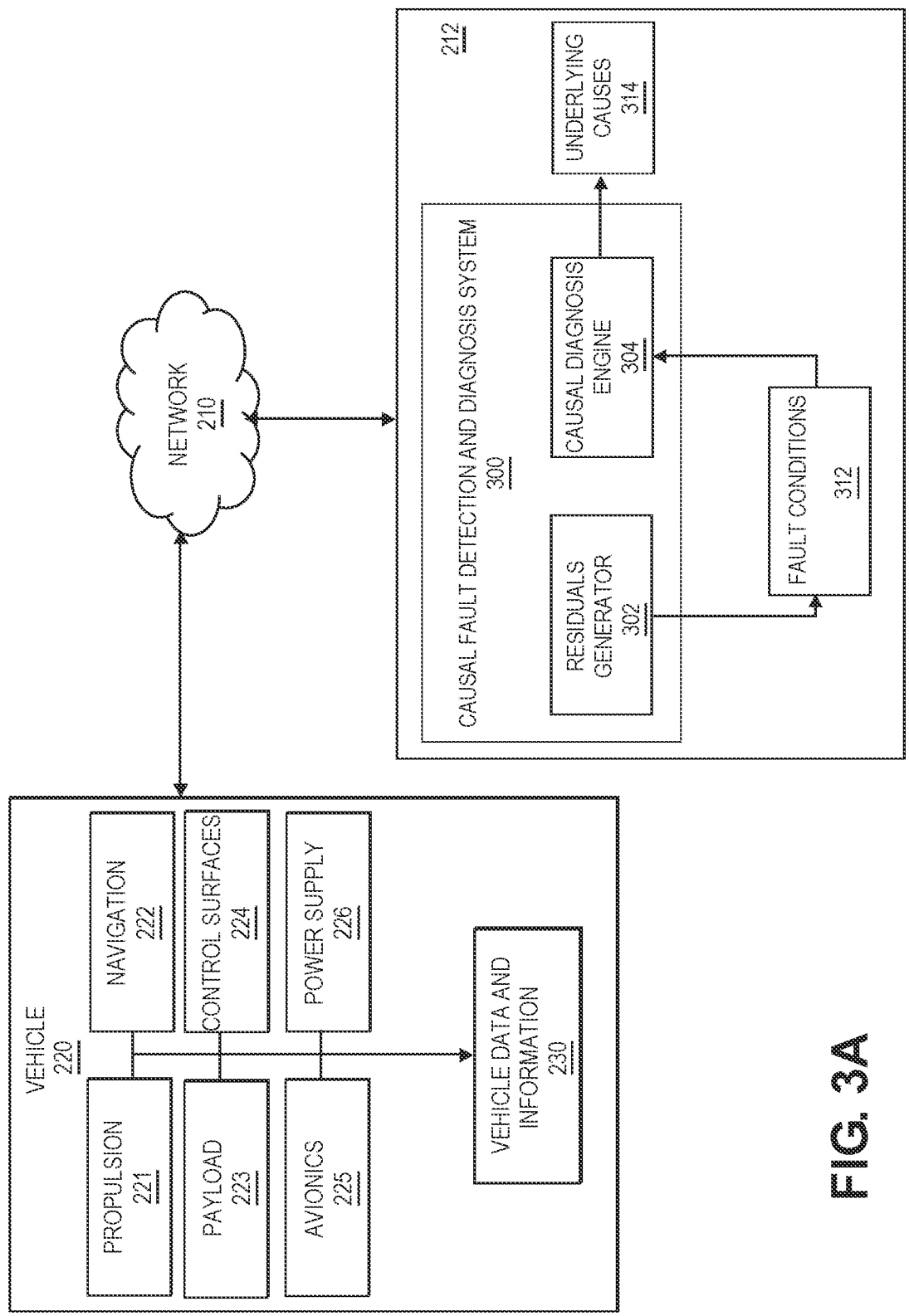
FIGS. 3A-3E are block diagrams illustrating an exemplary causal fault detection and diagnosis system, according to exemplary embodiments of the present disclosure.
Figure 3B:
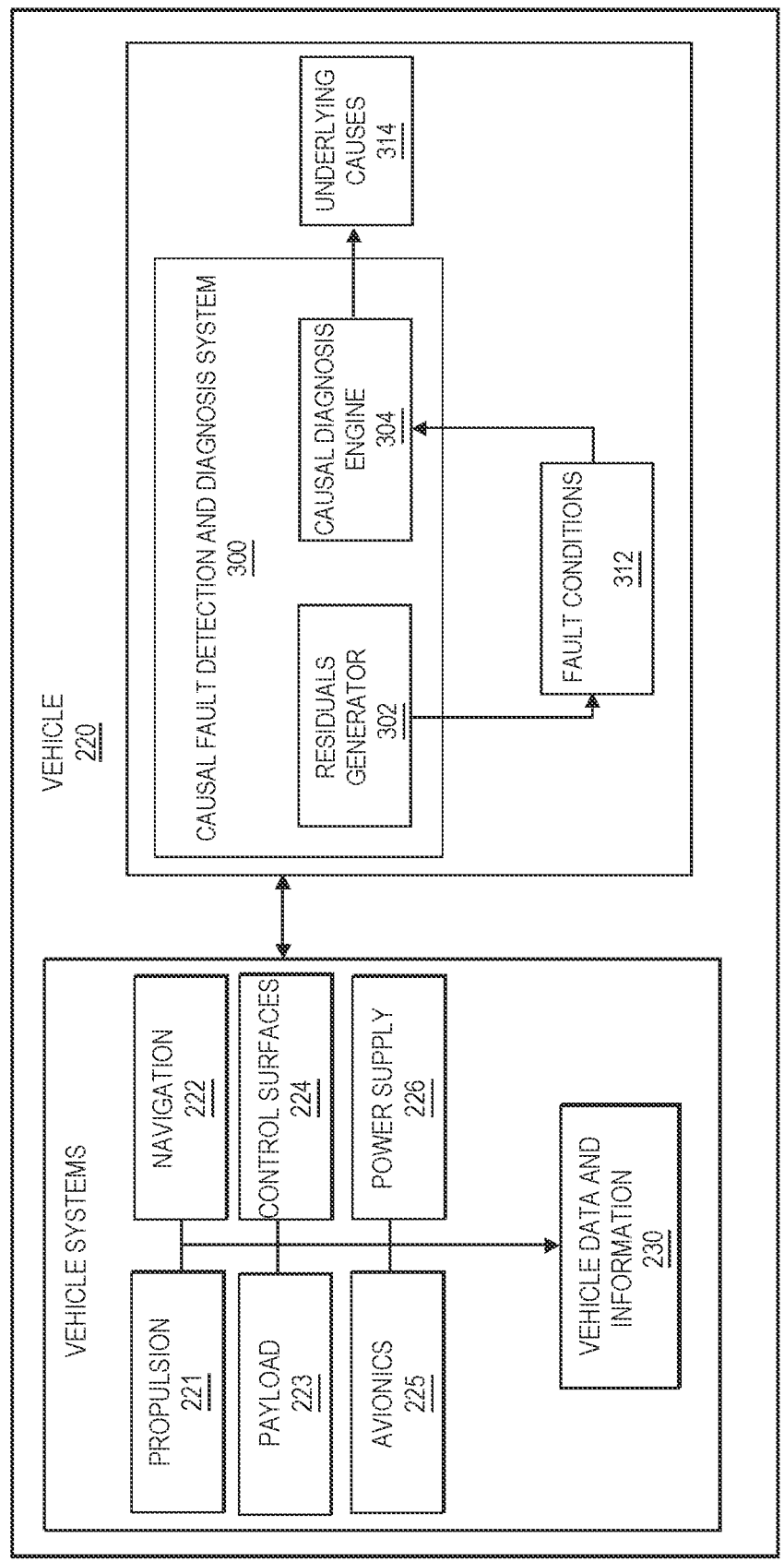

According to exemplary embodiments of the present disclosure, exemplary causal fault detection and diagnosis system 300 may be configured to detect and diagnose faults and/or anomalous operation of an autonomous vehicle, such as aerial vehicle 220-1 and/or aerial vehicle 220-2. As shown in FIGS. 3A and 3B, vehicle data and/or information 230 associated with the operation of vehicle 220 may be provided to causal fault detection and diagnosis system 300, and causal fault detection and diagnosis system 300 may be configured to process and analyze the provided vehicle data and/or information to detect and diagnose faults and/or anomalous operation associated with vehicle 220 based on the received vehicle data and/or information. In the implementation shown in FIG. 3A, causal fault detection and diagnosis system 300 may be executed and/or operated on a remote computing system, such as server 212. Alternatively and/or in addition, causal fault detection and diagnosis system 300 may be executed and/or operated by computing resources local on the vehicle.

Accordingly, vehicle data and/or information 230 may be provided to causal fault detection and diagnosis system 300 in the form of flight logs, event logs, or the like. In implementations where causal fault detection and diagnosis system 300 is executed and/or operated on a remote computing system, such as server 212, as shown in FIG. 3A, vehicle data and/or information 230 may be provided to causal fault detection and diagnosis system 300 via network 210. Alternatively and/or in addition, vehicle data and/or information 230 may be directly provided to causal fault detection and diagnosis system 300 in an implementation where causal fault detection and diagnosis system 300 is executed and/or operated locally on the vehicle (e.g., as shown in FIG. 3B). According to certain aspects of the present disclosure, vehicle data and/or information 230 may include a plurality of data and/or information associated with the environmental conditions encountered by vehicle 220, as well as the operation and/or performance of various systems, subsystems, and/or components of vehicle 220. For example, vehicle data and/or information 230 may include a continuous log of various measured and sensed parameters reflecting the operation of various components, systems, etc. of vehicle 220, such as propulsion system 221, navigation system 222, payload system 223, control surfaces 224, avionics 225, and/or power supply 226. Accordingly, vehicle data and/or information 230 may include a compilation of various sensed and measured parameters associated with various systems, subsystems, and/or components of vehicle 220, which may have been continuously recorded during operation of vehicle 220, as well as environmental conditions that may have been encountered by vehicle 220. Although vehicle 220 is illustrated including these exemplary systems and/or components, embodiments of the present disclosure contemplate vehicles with any number of systems, components, subsystems, etc.

As shown in FIGS. 3A and 3B, causal fault detection and diagnosis system 300 may include residuals generator 302 and causal diagnosis engine 304. Residuals generator 302 may receive vehicle data and/or information 230 associated with the operation and/or performance of vehicle 220, and may identify one or more anomalous residuals from the received vehicle data and/or information. Specifically, residuals generator 302 may compare vehicle data and/or information 230 associated with the operation and/or performance of vehicle 220 against the expected nominal performance and/or operation of vehicle 220. Any data and/or information that is identified as deviating from the expected nominal operation and/or performance may be identified as an anomalous residual. Further, since the anomalous residuals are detected as deviations from the expected nominal operation of vehicle 220, no prior knowledge of the fault is required to identify and/or diagnose the anomalous residual and/or fault condition. After one or more anomalous residuals have been identified, it may be determined whether each anomalous residual is a fault condition 312, and causal diagnosis engine 304 may determine one or more underlying causes associated with each fault condition 312.

In one exemplary implementation of embodiments of the present disclosure, vehicle 220 may monitor, record, measure, sense, or otherwise monitor parameters associated with the environment, as well as the operation of the various systems, subsystems, and/or components of vehicle 220 during operation of vehicle 220 (e.g., during a mission, testing, etc.). For example, vehicle 220 may measure parameters, such as, voltages, currents, temperatures, movements, response to commands, or other parameters associated with the various systems, subsystems, and/or components (e.g., propulsion system 221, navigation system 222, payload system 223, control surfaces 224, avionics 225, power supply 226, and/or other systems, subsystems, and/or components) of vehicle 220. In addition to providing direct data and/or information regarding the operation and/or performance of vehicle 220, the parameters can provide data and/or information regarding the structure of vehicle 220 (e.g., structural integrity, presence of cracks and/or micro cracks, fatigue of components, etc.). Accordingly, the measured values for the various parameters may be recorded in a flight log, an event log, or the like that may be generated and maintained by vehicle 220. For example, the flight log, event log, or the like may include an array or matrix of every value measured for each parameter during any given mission or operation of vehicle 220. Alternatively and/or in addition, the flight log, event log, or the like, may identify maximum and minimum values for each measured parameter and may record the range of values measured for each parameter. Other statistical processing and manipulation (e.g., mean, mode, median, statistical distributions, etc.) may also be employed in recording and maintaining the various data and/or information associated with the performance and/or operation of the systems, subsystems, and/or components of vehicle 220.

Vehicle data and/or information 230 may then be provided to causal fault detection and diagnosis system 300, which can process and analyze vehicle data and/or information 230 to detect and diagnose fault conditions and/or anomalous operation of vehicle 220. First, residuals generator 302 of causal fault detection and diagnosis system 300 can compare vehicle data and/or information 230 against expected nominal performance and/or behavior of vehicle 220 to identify one or more anomalous residuals and potential fault conditions. For example, if the expected input voltage for a Motor1 is 5V and vehicle data and/or information 230 recorded an input voltage of 7V for Motor1, residuals generator 302 would identify the measured input voltage for Motor1 to be an anomalous residual. Similarly, if to maintain the prescribed flight path of the mission, a command is sent to ControlSurface1 to maintain a deflection angle of 10° and vehicle data and/or information 230 recorded a deflection angle of 20° to maintain the prescribed flight path of the mission, residuals generator 302 would identify the operation of ControlSurface1 to be an anomalous residual. These are merely two hypothetical anomalous residuals that may be identified by residuals generator 302. Embodiments of the present disclosure contemplate identifying any number of anomalous residuals associated with any parameters corresponding to any system, subsystem, and/or component of a vehicle, such as vehicle 220.

Moreover, in determining anomalous residuals, residuals generator 302 can also process and analyze vehicle data and/or information 230 relating to environmental parameters measured and recorded by vehicle 220. The data and/or information relating to environmental conditions encountered by vehicle 220 can facilitate providing context to vehicle data and/or information recorded 230 pertaining to the performance and/or operation of the various systems, subsystems, and/or components of vehicle 220. For example, certain vehicle data and/or information 230 may be recognized as anomalous behavior under certain environmental conditions but may be recognized as expected nominal behavior under other certain environmental conditions. Accordingly, residuals generator 302 can utilize data and/or information associated with environmental conditions to provide context in identifying anomalous residuals. For example, in a hypothetical situation where a command is sent to Motor2 to operate at 20,000 RPM at a certain time, but vehicle data and/or information 230 indicates that Motor2 was operating at 40,000 RPM at the specified time. Residuals generator 302 may consider data and/or information relating to environmental conditions to assess whether the operation of Motor2 at the higher RPM was a result of an environmental condition for which vehicle 220 may have been compensating to maintain the desired navigating and/or operating parameters of vehicle 220.

Figure 3C:
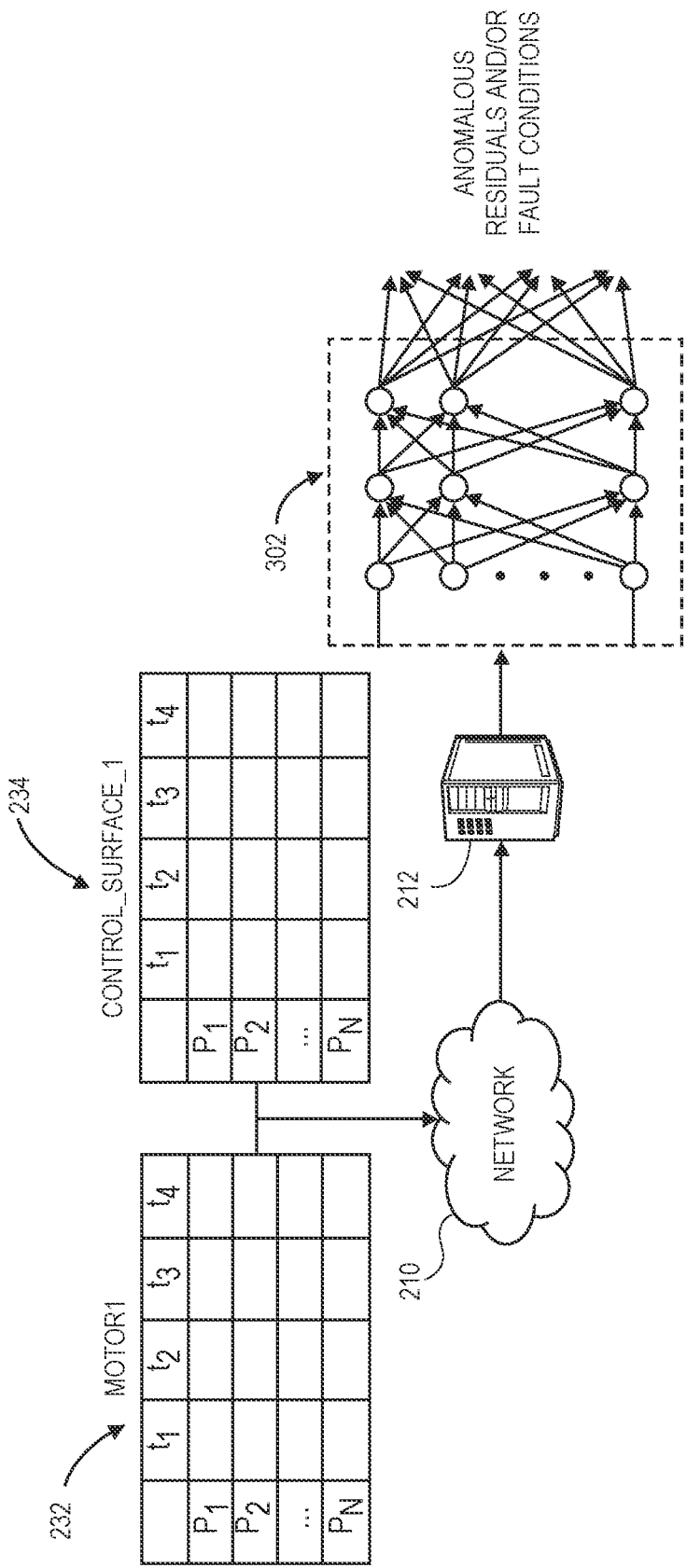
Figure 3D:
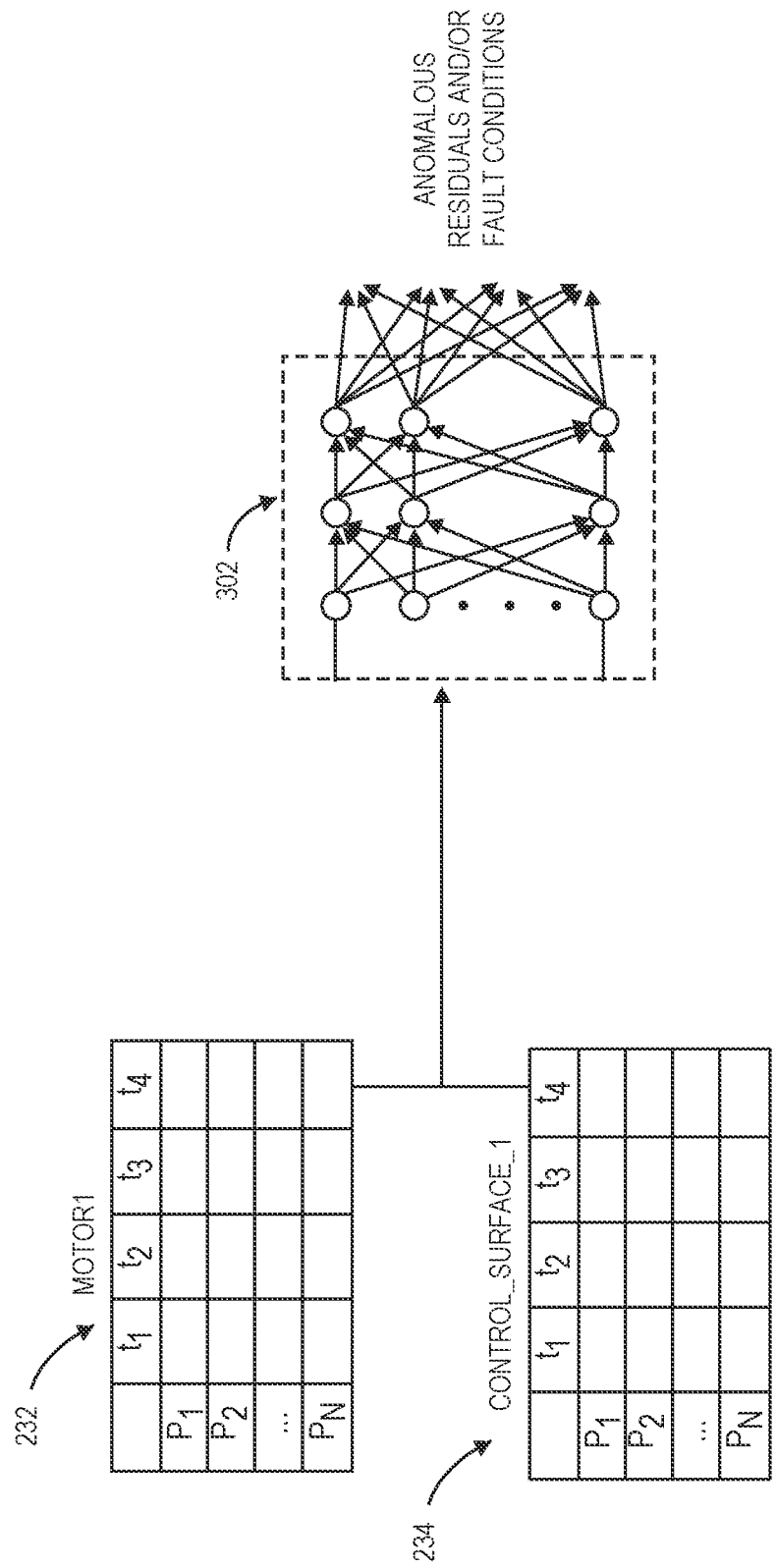

FIGS. 3C and 3D are block diagrams illustrating exemplary data and/or information that may be included in vehicle data and/or information 230. As shown in FIGS. 3C and 3D, parameters 232 may include measured and/or recorded values for MOTOR1 parameters $P_1, P_2, \ldots, P_N$ at times $t_1, t_2, t_3$, and $t_4$, and parameters 234 may include measured and/or recorded values for CONTROL_SURFACE_1 parameters $P_1, P_2, \ldots, P_N$ at times $t_1, t_2, t_3$, and $t_4$. As shown in FIG. 3C, parameters 232 and 234 may be provided, via network 210, as part of vehicle data and/or information 230 to server 212, which may operate and/or execute residuals generator 302. Alternatively and/or in addition, in implementations where causal fault detection and diagnosis system 300 is executed and/or operated locally on the vehicle (e.g., as shown in FIGS. 3B and 3D), vehicle data and/or information 230 may be directly provided to causal fault detection and diagnosis system 300. Accordingly, based on the data and/or information included in parameters 232 and/or 234, residuals generator 302 may identify one or more anomalous residuals.

After one or more anomalous residuals have been identified by residuals generator 302, the value of each anomalous residual can be compared against an error bound(s) to determine whether each anomalous residual is a fault condition 312. The error bound(s) for each parameter may be individually determined using various statistical processes and analyses to determine which anomalous residuals are fault conditions 312. For example, according to certain aspects of the present disclosure, any outlier and/or cluster detection algorithms may be employed (e.g., Tukey's fences, Isolation Forest techniques, covariance determination techniques, local outlier factor techniques, k-means clustering, means-shift clustering, Gaussian-based modeling, etc.) to determine the error bound(s) against which the anomalous residuals can be compared in determining which anomalous residual is a fault condition. According to aspects of the present disclosure, fault conditions 312 can be identified on the component level, system level, at the environmental level, etc.

According to embodiments of the present disclosure, once one or more anomalous residuals have been identified and categorized as a fault condition 312, causal diagnosis engine 304 may determine one or more underlying causes 314 associated with each fault condition 312. For example, vehicle data and/or information 230 may be continuously provided to causal fault detection and diagnosis system 300 via network 210 in real-time as vehicle 220 is navigating and/or performing a mission. Alternatively and/or in addition, in implementations where causal fault detection and diagnosis system 300 is executed and/or operated locally on the vehicle (e.g., as shown in FIGS. 3B and 3D), vehicle data and/or information 230 may be directly provided in real-time to causal fault detection and diagnosis system 300 as real-time feedback regarding the operation and/or performance of the vehicle. Accordingly, residuals generator 302 may continuously identify fault conditions 312 throughout the duration of the operation and/or mission of vehicle 220. Accordingly, a plurality of anomalous residuals may be identified at various different instances during the duration of the operation and/or mission of vehicle 220. Further, each instance where a fault condition 312 is identified may include a plurality of values over a period of time. For example, a fault condition 312 may be identified at minutes 5, 13, and 28 of an exemplary mission, and the fault conditions 312 identified at minutes 5, 13, and 28 of the exemplary mission may each include a time series of measured values over a certain period of time. Causal diagnosis engine 304 may determine one or more potential underlying causes of the fault conditions 312 by identifying patterns and/or relationships between the time series values of the fault conditions 312 across different time windows at which each instance fault condition 312 was identified and recorded. For example, it may be determined that certain fault conditions present themselves and/or become more pronounced when the vehicle is performing a certain maneuver or when given a specific command. Based on the determination of the underlying causes for the various fault conditions, causal diagnosis engine 304 can generate a report, which may include the various fault condition values, as well as the predicted one or more underlying causes for each fault condition. An exemplary report is discussed in further detail herein in connection with FIG. 7.

Figure 3E:
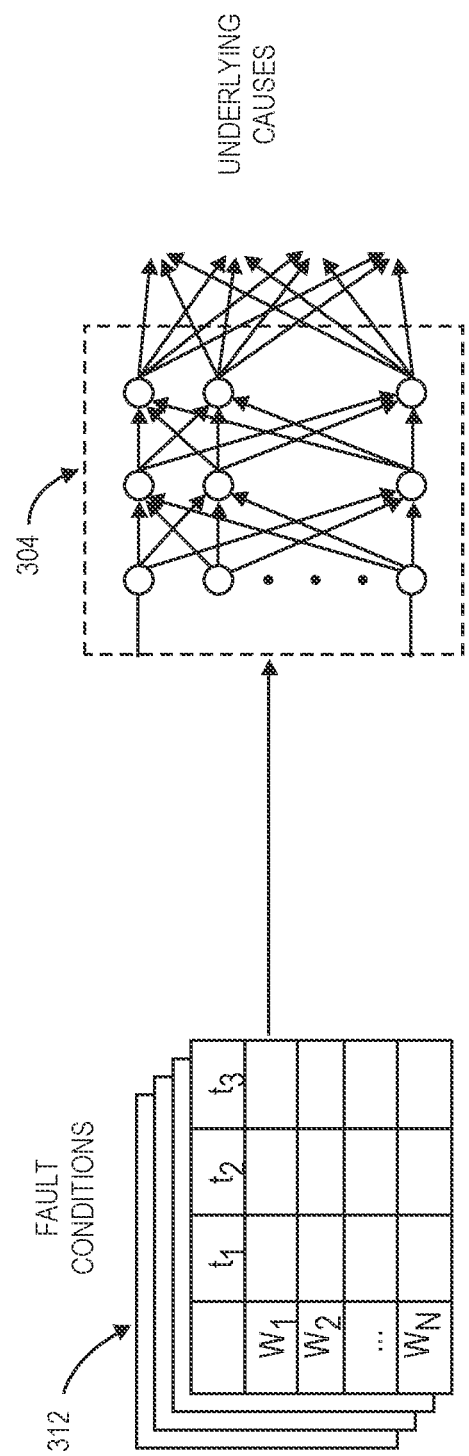

FIG. 3E is a block diagram illustrating exemplary data and/or information that may be included in fault conditions 312 to be provided to causal diagnosis engine 304. As shown in FIG. 3E, fault conditions 312 may include measured and/or recorded parameters/values for various fault conditions at times $t_1$, $t_2$, and $t_3$ within certain time windows $W_1$, $W_2$, ..., $W_N$. Accordingly, causal diagnosis engine 304 may determine one or more potential underlying causes of fault conditions 312 by identifying patterns and/or relationships between the values of the fault conditions recorded over the periods of time at each instance the fault condition was identified.

According to certain aspects of the present disclosure, residuals generator 302 and/or causal diagnosis engine 304 can include one or more trained machine learning systems. For example, server 212 may be configured to train and/or execute one or more machine learning systems, such as artificial neural networks, e.g., convolutional neural networks, that may be configured to process environmental and vehicle data and/or information (e.g., in a flight log, an event log, etc.) identify anomalous residuals and/or fault conditions and the underlying causes that may have resulted in the identified anomalous residuals and/or fault conditions. For example, in some implementations, a machine learning system executed by server 212 may be trained by providing information or data representing expected nominal operation and/or behavior of the vehicle to the machine learning system as training inputs, e.g., in a supervised manner, and a set of outputs received from the machine learning system may be compared to a set of training outputs. Alternatively, in implementations where causal fault detection and diagnosis system 300 is executed and/or operated locally on the vehicle (e.g., as shown in FIGS. 3B and 3D), a machine learning system local to the vehicle may be trained by providing information or data representing expected nominal operation and/or behavior of the vehicle to the machine learning system as training inputs, e.g., in a supervised manner, and a set of outputs received from the machine learning system may be compared to a set of training outputs. Additionally, further machine learning systems may be trained by providing information or data associated with fault conditions to the machine learning system as training inputs, e.g., in a supervised manner, and a set of outputs received from the machine learning system may be compared to a set of training outputs to sensitize the machine learning system to various fault conditions. Alternatively, in some implementations, information or data may be provided to the machine learning system as training inputs, e.g., in an unsupervised manner. The machine learning systems executed by the server 212 may include one or more artificial neural networks (e.g., convolutional neural networks) that are trained to map inputted information or data regarding expected nominal operation and/or performance of a vehicle to desired outputs by adjusting strengths of connections between one or more neurons, which are sometimes called synaptic weights, and may have any number of layers, e.g., an input layer, an output layer, and any number of intervening hidden layers. Alternatively, the machine learning systems may be any other type or form of algorithm, system or technique. According to aspects of the present disclosure, the training inputs provided to the residuals generator machine learning system may be obtained from data and/or information collected during the operating and/or navigating of multiple controlled missions substantially simultaneously in substantially the same environment. This can facilitate marginalizing external environmental conditions so as to isolate the expected nominal performance of the vehicle. Training of the residuals generator is descried further herein in connection with FIG. 4.

Figure 4:
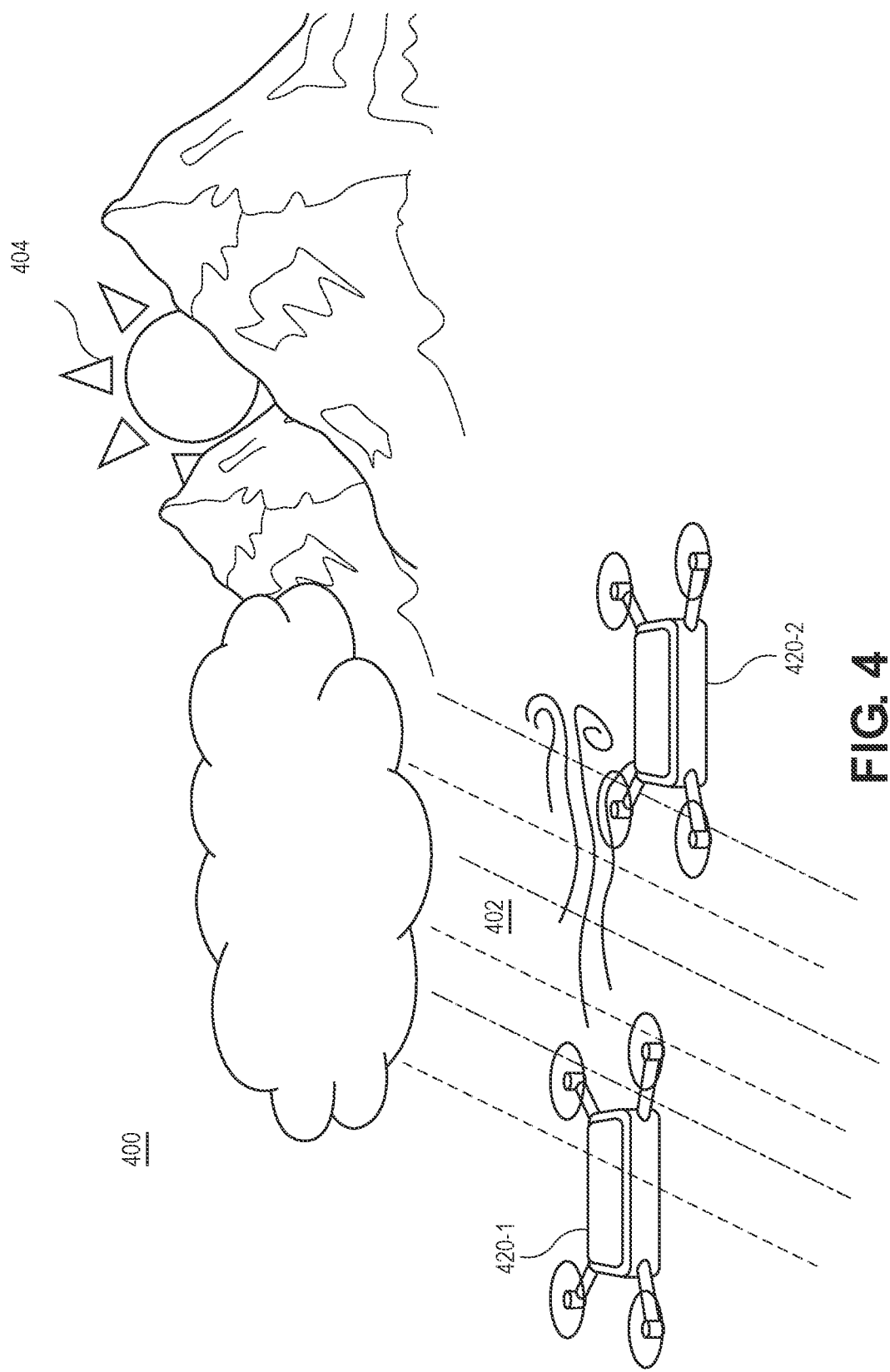
FIG. 4 is an illustration of an exemplary environment in which unmanned aerial vehicles may operate, according to exemplary embodiments of the present disclosure.

FIG. 4 is an illustration of an exemplary environment 400 in which aerial vehicles may operate, according to exemplary embodiments of the present disclosure. According to certain exemplary embodiments, aerial vehicle 420-1 and/or aerial vehicle 420-2, as shown in FIG. 4, may include aerial vehicle 100 as shown and described in connection with FIG. 1.

As shown in FIG. 4, aerial vehicle 420-1 and aerial vehicle 420-2 may be operating and/or navigating in environment 400 to obtain and collect training input data for training a machine learning system, such as residuals generator 302. In collection of the training data, one of aerial vehicle 420-1 and aerial vehicle 420-2 may be designated as the nominal operation vehicle, while both aerial vehicle 420-1 and aerial vehicle 420-2 operate and/or navigate under substantially the same CONOPS, in substantially the same geographic area in environment 400 at substantially the same time. For example, aerial vehicle 420-2 may be designated as the nominal performance vehicle while aerial vehicle 420-1 may be performing a mission. This can facilitate presenting substantially the same environmental conditions to both aerial vehicle 420-1 and aerial vehicle 420-2 such that the measured and recorded data and/or information can form the nominal basis for identifying anomalous residuals.

Accordingly, in the implementation where aerial vehicle 420-2 is designated as the nominal operation vehicle, aerial vehicle 420-2 may first undergo thorough and rigorous inspection, maintenance, and/or testing to ensure proper operation and/or performance. After such inspection, maintenance, and/or testing have been completed, aerial vehicle 420-2 may perform a controlled mission in environment 400 while aerial vehicle 420-1 performs a mission in environment 400. The controlled mission may include, for example, a limited, controlled mission (e.g., specified maneuvers in a limited geographic area, hovering in place, or other controlled missions, etc.) under the same CONOPS as aerial vehicle 420-1, within environment 400.

While navigating in environment 400, aerial vehicle 420-1 and aerial vehicle 420-2 may continuously measure and/or record data and/or information in connection with parameters associated with environment 400 (e.g., temperature, precipitation, relative humidity, wind, visibility, etc.) and the performance and operation of the various systems, subsystems, and/or components of aerial vehicle 420-1 and aerial vehicle 420-2, such as input voltages, input currents, temperatures, impedances, rotation rates of the motors, operation of control surfaces, behavior of aerial vehicle 420-1 and/or aerial vehicle 420-2 in response to certain commands (e.g., motor settings, control surface settings, etc.), images, energy expenditure, as well as other parameters. Further, the data and/or information may be measured and collected in connection with the vehicle's navigation system, sensors, control surfaces, motors, avionics, power source (e.g., battery, etc.), payload, the environment, etc., and may be recorded in a flight log, an event log, or the like that may be generated by aerial vehicle 420-1 and aerial vehicle 420-2.

Further, since aerial vehicle 420-1 and aerial vehicle 420-2 are operating and/or navigating under substantially the same CONOPS, in substantially the same geographic area at substantially the same time, they would likely encounter substantially similar environmental conditions and certain performance requirements. As shown in FIG. 4, in environment 400, aerial vehicle 420-1 and aerial vehicle 420-2 may experience wind and precipitation 402, as well as glare presented by sun 404, as well as other environmental conditions. Accordingly, the vehicle data and/or information of both aerial vehicle 420-1 and aerial vehicle 420-2 may reflect the similar environmental conditions experienced by both aerial vehicle 420-1 and aerial vehicle 420-2. Comparison of the vehicle data and/or information of aerial vehicle 420-1 and aerial vehicle 420-2 may then facilitate marginalizing environmental conditions experienced by aerial vehicle 420-1 and aerial vehicle 420-2, as well as responses to certain operational parameters specified in the operating CONOPS, so as to isolate the expected nominal behavior and/or operation of aerial vehicle 420-1 and/or aerial vehicle 420-2. Accordingly, any affects attributable to environmental conditions, mission operational parameters, and/or requirements imposed by the operating CONOPS can be marginalized out of the vehicle data and/or information corresponding to the nominal performance vehicle (e.g., aerial vehicle 420-2) to generate the expected nominal basis of operation for the aerial vehicle. The expected nominal basis of operation can then be used as input training data to train residuals generator 302 such that residuals generator 302 can identify anomalous residuals in vehicle data and/or information corresponding to the operation and/or navigation of vehicles.

Figure 5:
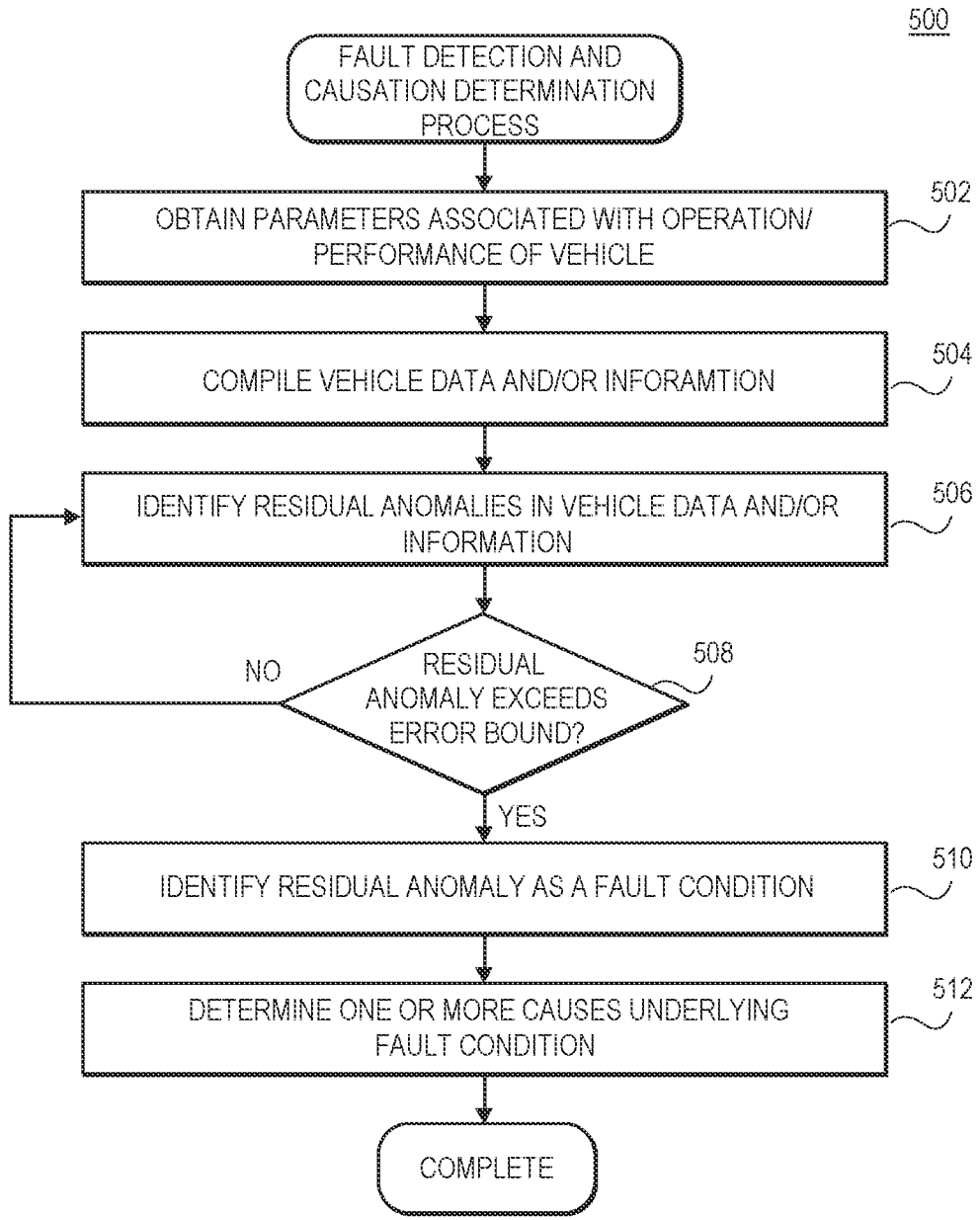
FIG. 5 is a flow diagram of an exemplary fault detection and causation determination process, according to exemplary embodiments of the present disclosure.

FIG. 5 is a flow diagram of an exemplary fault detection and causation determination process 500, according to exemplary embodiments of the present disclosure.

As shown in FIG. 5, the exemplary fault detection and causation determination process 500 can begin in step 502 with the collecting and obtaining of parameters associated with the operation and/or performance of a vehicle, such as aerial vehicle 220. This may be performed, for example, as the vehicle is performing a mission and can include a plurality of data and/or information associated with the environmental conditions encountered by the vehicle, as well as the operation and/or performance of various systems, subsystems, and/or components of the vehicle. For example, the vehicle may include a variety of sensors, such as imaging devices, an inertial measurement unit, accelerometers, gyroscopes, navigational sensors, thermal sensors, infrared sensors, laser sensors (e.g., LIDAR, etc.), pressure sensors, voltmeters, ammeters, or other sensors that may continuously monitor the operation of the various systems and components of the vehicle, as well as external operational conditions, such as the environment, weather, etc. Some exemplary parameters that may be obtained may include parameters associated with the environment, such as temperature, precipitation, relative humidity, wind, visibility, etc., as well as parameters associated with the vehicle, such as various voltages, currents, impedances, power consumption, temperatures, movements, response to commands, or other parameters associated with the various systems, subsystems, and/or components (e.g., propulsion systems, navigational systems, payload systems, control surfaces, avionics, power, and/or other systems, subsystems, and/or components) of the vehicle. Collection of the parameters may be controlled and managed by a control system of the vehicle, such as the control system described herein in connection with FIG. 9.

In step 504, the collected parameters may be compiled in a flight log, an event log, or the like. For example, the compiled vehicle data and/or information may be continuously updated with additional parameters as further values are measured and collected during operation of the vehicle. Alternatively and/or in addition, the collected parameters may be aggregated and compiled in another form. For example, the vehicle data and/or information may include an array or matrix of every value measured for each parameter at certain times during a mission or operation of the vehicle. Alternatively and/or in addition, the vehicle data and/or information may identify maximum and minimum values for each measured parameter during a specific mission and may record the range of values measured for each parameter. Other statistical processing and manipulation (e.g., mean, mode, median, statistical distributions, etc.) may also be employed in recording and maintaining the various data and/or information associated with the performance and/or operation of the systems, subsystems, and/or components of the vehicle.

In step 506, anomalous residuals may be identified (e.g., using residuals generator 302) based on the vehicle data and/or information. For example, the vehicle data and/or information may be compared against an expected nominal performance and/or behavior of the vehicle to identify one or more anomalous residuals and potential fault conditions. Moreover, vehicle data and/or information relating to environmental parameters measured and recorded can also be considered to facilitate providing context to the vehicle data and/or information pertaining to the performance and/or operation of the various systems, subsystems, and/or components of the vehicle. For example, certain vehicle data and/or information may be recognized as anomalous behavior under certain environmental conditions, but may be recognized as expected nominal behavior under other certain environmental conditions. Accordingly, such data and/or information associated with environmental conditions can also be utilized to provide context in identifying anomalous residuals.

After one or more anomalous residuals have been identified in step 506, the value of each anomalous residual can be compared against an error bound(s) to determine whether each anomalous residual is a fault condition, as in step 508. For example, anomalous residuals falling outside of the error bound(s) may be considered to be a fault condition, whereas anomalous residuals having values within the error bounds may be considered to be operating within the normal operating parameters of the vehicle. According to certain aspects, anomalous residuals that may not exceed the error bound(s) (and those that do exceed the error bound(s)) may nevertheless be tracked and monitored so as to identify any degradation of the operation and/or performance of any parameter of the vehicle and to better identify interrelations and patterns in anomalous residuals and/or fault conditions (e.g., certain anomalous residuals and/or fault conditions associated with certain components may consequently lead to other anomalous residuals, certain values of certain anomalous residuals and/or fault conditions associated with certain components may consequently lead to other anomalous residuals, etc.). The error bound(s) applied to each parameter may be individually determined using various statistical processes and analyses to determine which anomalous residuals are sufficient outliers to present as a fault condition. For example, according to certain aspects of the present disclosure, Tukey's fences can be used as the error bound(s) against which the anomalous residuals can be compared in determining which anomalous residual is a fault condition. According to aspects of the present disclosure, fault conditions can be identified on the component level, system level, at the environmental level, etc.

In the event that the anomalous residual does not exceed the error bound(s), the process proceeds to identify a further anomalous residual. However, if it is determined that the anomalous residual exceeds the error bound, the anomalous residual may be identified as a fault condition, as in step 510. Next, in step 512, one or more causes underlying the fault condition can be determined (e.g., by causal diagnosis engine 304). For example, patterns, relationships, and/or interdependencies between the time series values of fault condition identified and recorded across different time windows. Based on the identified patterns, relationships, and/or interdependencies, one or more causes underlying the fault condition can be identified. Further, the anomalous residuals and/or fault conditions can be sensitized to various underlying causes over time.

Figure 6:
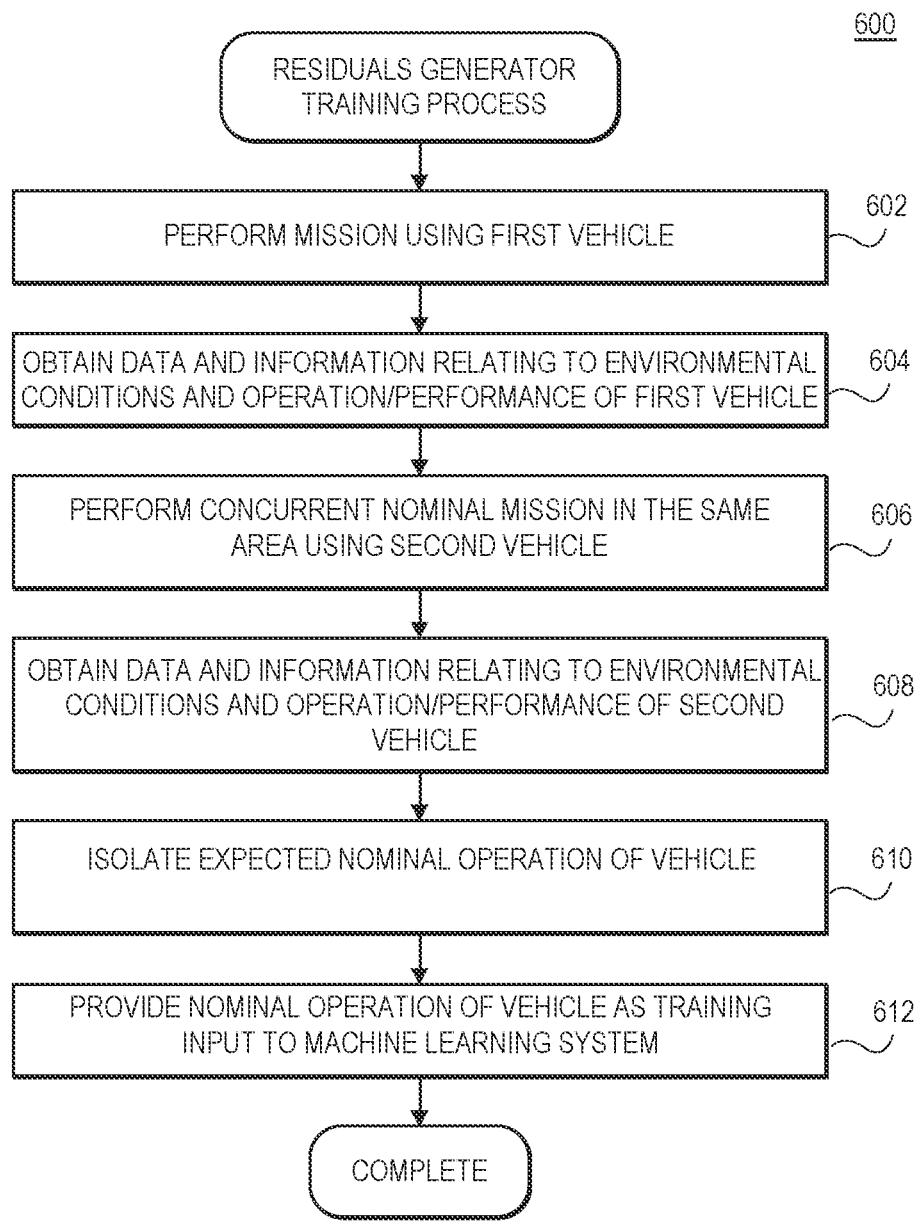
FIG. 6 is a flow diagram of an exemplary residuals generator training process, according to exemplary embodiments of the present disclosure.

FIG. 6 is a flow diagram of an exemplary residuals generator training process 600, according to exemplary embodiments of the present disclosure.

As shown in FIG. 6, the residuals generator training process 600 can begin in step 602 by performing a mission using a first vehicle, such as aerial vehicle 420-1. For example, the mission being performed by the vehicle can include any mission, such as delivering packages or other items, navigating from an origin to a destination, taking images or videos of an area, surveying or performing other surveillance of an area, or performing other missions.

While the vehicle is performing the mission, the vehicle may be continuously obtaining data and/or information associated with the current environmental conditions, as well as the operation and/or performance of the vehicle, as in step 604. This data and/or information may be obtained via a variety of sensors, such as imaging devices, an inertial measurement unit, accelerometers, gyroscopes, navigational sensors, thermal sensors, infrared sensors, laser sensors (e.g., LIDAR, etc.), pressure sensors, voltmeters, ammeters, or other sensors that may continuously monitor the operation of the various systems and components of the vehicle, as well as external operational conditions, such as the environment, weather, etc. Some exemplary parameters that may be obtained may include parameters associated with the environment, such as temperature, precipitation, relative humidity, wind, visibility, etc., as well as parameters associated with the vehicle, such as various voltages, currents, impedances, power consumption, temperatures, movements, response to commands, or other parameters associated with the various systems, subsystems, and/or components (e.g., propulsion systems, navigational systems, payload systems, control surfaces, avionics, power, and/or other systems, subsystems, and/or components) of the vehicle. Collection of the parameters may be controlled and managed by a control system of the vehicle, such as the control system described herein in connection with FIG. 9.

In step 606, a second mission for obtaining the expected nominal performance of the vehicle is performed concurrently with and in substantially the same geographic area as the mission performed by the first vehicle in step 602. As with the mission performed by the first vehicle, the second vehicle may also continuously measure and/or record data and/or information in connection with parameters associated with the environment (e.g., temperature, precipitation, relative humidity, wind, visibility, etc.) and the performance and operation of the various systems, subsystems, and/or components of the vehicle, such as input voltages, input currents, temperatures, impedances, rotation rates of the motors, operation of control surfaces, behavior of the vehicle in response to certain commands (e.g., motor settings, control surface settings, etc.), images, energy expenditure, as well as other parameters, as in step 608.

Further, as the data and information obtained and collected by the second vehicle during the second nominal mission may form the nominal basis as the input training data for the residuals generator, prior to performance of the mission, the second vehicle may first undergo thorough and rigorous inspection, maintenance, and/or testing to ensure proper operation and/or performance. Further, the nominal mission performed by the second vehicle may be a limited, controlled mission such as, for example, a limited mission that may include specified maneuvers in a limited geographic area, hovering in place, or other controlled missions within substantially the same geographic area as the mission being performed by the first vehicle.

Further, since both missions are being performed concurrently in substantially the same geographic area, both vehicles would likely encounter similar environmental conditions. Accordingly, this can facilitate marginalizing the environmental and operational effects on the operation and performance of the vehicles so as to isolate the expected nominal operation of the vehicles. Specifically, because both vehicles are operating and/or navigating under the same CONOPS, in substantially the same geographic area, at substantially the same time, they would likely encounter substantially similar environmental and operational conditions. Accordingly, the recoded data and/or information of both vehicles may reflect the similar environmental conditions experienced by both vehicles. Processing and comparison of the various data and information may then facilitate marginalizing environmental conditions, as well as certain operational affects attributable requirements imposed by the mission and/or common operating CONOPS, experienced by both vehicles so as to isolate the expected nominal behavior of the vehicles. Accordingly, any affects attributable to environmental and/or operational conditions can be marginalized out of the data and information to isolate the expected nominal operation of the vehicle, as in step 610. In step 612, the expected nominal operation of the vehicle can then be used as input training data to train a machine learning system (e.g., residuals generator 302) that may be trained to identify anomalous residuals and/or fault conditions.

FIG. 7 is an illustration of an exemplary presentation 700, of a fault condition report, according to exemplary embodiments of the present disclosure. For example, presentation 700 of a fault condition report may be generated by causal fault detection and diagnosis 300 in connection with a mission performed by a vehicle. Presentation 700 is merely exemplary, and the fault condition reports can be presented in any format, orientation, etc. without departing from the exemplary embodiments of the present disclosure.

As shown in FIG. 7, presentation 700 can include identifier 702 (e.g., Flight Number 10") identifying the mission, vehicle, or other identifier to which the fault condition report corresponds. Additionally, presentation 700 can include a listing of the component, system, subsystem, or other element 704, a measured and/or recorded value 706 for a parameter associated with the respective component, a status 708 of the component based on the measured value, and a possible underlying cause 710, if applicable.

According to exemplary embodiments, the components 704 listed can include a listing of all components monitored by a vehicle during performance of a mission for which data and/or information is measured and/or recorded. Although FIG. 7 lists components such as motors, control surfaces, and a payload door, embodiments of the present disclosure are not limited thereto and contemplate all systems, subsystems, components, and other portions of the vehicle that may be monitored during operation of the vehicle.

As shown in FIG. 7, a value 706 may be listed for each of the various components 704. The values 706 shown in FIG. 7 may correspond to an instantaneous value being provided by the vehicle in real-time, a mean or median value over the course of a mission, or another statistical representation of the recorded value 706 for the respective component 704. According to exemplary embodiments of the present disclosure, these values may used (e.g., by residuals generator 302 of causal fault detection and diagnosis system 300) to identify anomalous residuals.

Status 708 may represent the operational status of the respective component. As shown in FIG. 7, a check mark may indicate the respective component is performing and/or operating as expected, whereas the exclamation mark may indicate a fault condition. Specifically, the exclamation mark status may indicate that an anomalous residual was identified, and the value of the anomalous residual exceeded an error bound threshold established for the measured parameter of the respective component. Optionally, status 708 may include additional status indicators (e.g., a further indicator representing that an anomalous residual was identified, however, the value of the measured parameter did not exceed the error bound to result in a fault condition, etc.). Further, according to certain aspects, all anomalous residuals may be tracked to identify relationships and patterns associated with various anomalous residuals. For example, it may be found that certain anomalous residuals associated with Motor 0 may disproportionately lead to anomalous residuals associated with Control Surface 1. Alternatively, a low value anomalous residual associated with Motor 0 may disproportionately lead to anomalous residuals associated with Control Surface 1, but a high value anomalous residual associated with Motor 0 may disproportionately lead to anomalous residuals associated with Motor 1, etc.

Additionally, presentation 700 may also present possible underlying causes 710 for each respective component, as necessary. For example, the possible underlying causes 710 may have been determined by causal diagnosis engine 304 of causal fault detection and diagnosis system 300. Further, the possible underlying causes 710 may be further sensitized to certain anomalous residuals and/or fault conditions over time to be able to more accurately predict the possible underlying causes 710.

Figure 8:
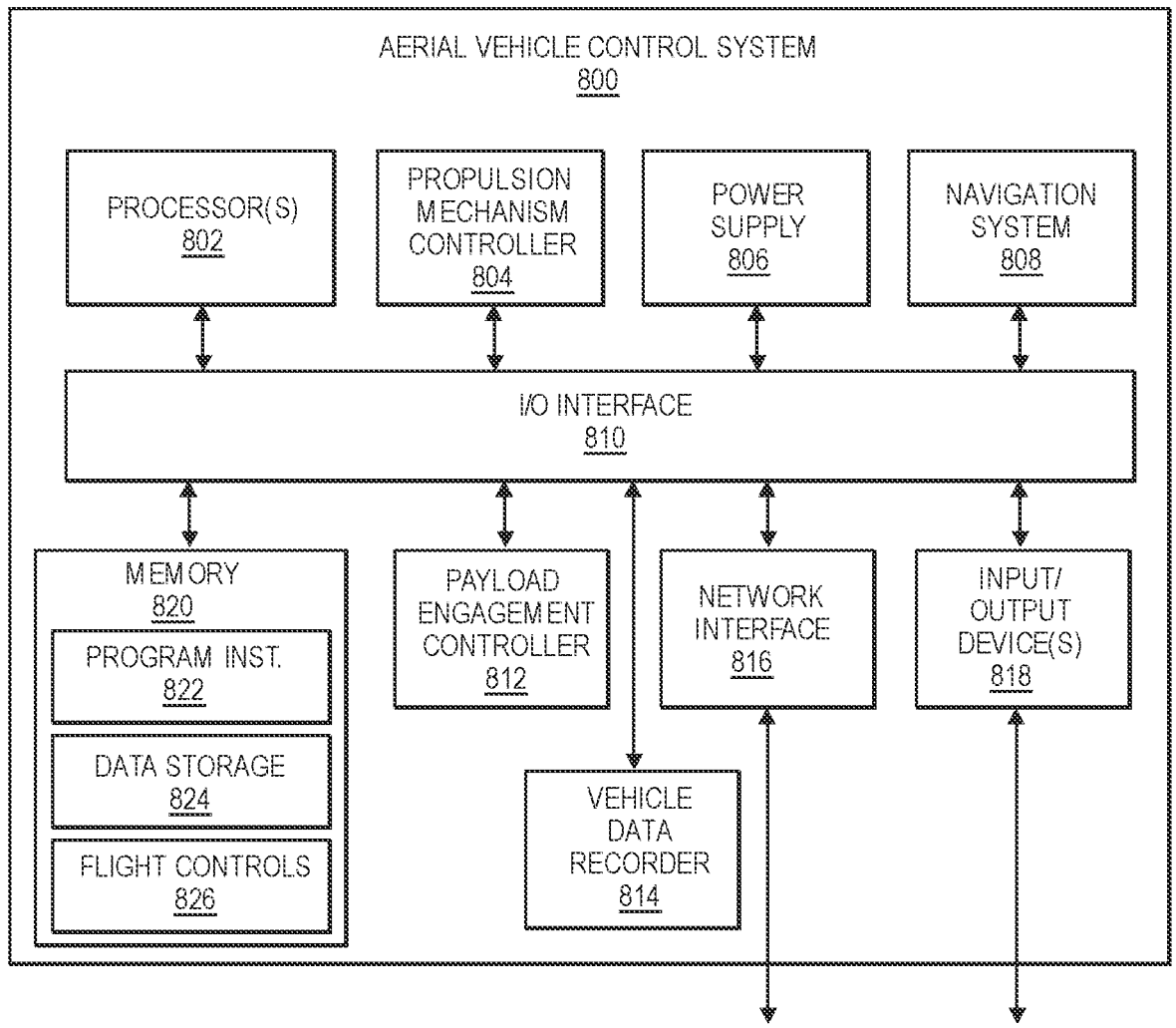
FIG. 8 is a block diagram illustrating various components of an exemplary aerial vehicle control system, according to embodiments of the present disclosure.

FIG. 8 is a block diagram illustrating various components of an exemplary aerial vehicle control system 800, according to embodiments of the present disclosure.

In various examples, the block diagram may be illustrative of one or more aspects of the aerial vehicle control system 800 that may be used to implement the various systems and methods discussed herein and/or to control operation of an aerial vehicle discussed herein. In the illustrated implementation, the aerial vehicle control system 800 includes one or more processors 802, coupled to a memory, e.g., a non-transitory computer readable storage medium 820, via an input/output (I/O) interface 810. The aerial vehicle control system 800 also includes propulsion mechanism controllers 804, such as electronic speed controls (ESCs) or motor controllers, power modules 806 and/or a navigation system 808. The aerial vehicle control system 800 further includes a payload engagement controller 812, a vehicle data recorder 814 configured to monitor and record data and/or information relating to certain parameters corresponding to the performance and/or operation of the vehicle, as described herein, a network interface 816, and one or more input/output devices 818.

In various implementations, the aerial vehicle control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, navigation and flight control data, environment data, vehicle data, and/or other data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822, data storage 824 and flight controls 826, respectively. In other implementations, program instructions, data, and/or flight controls may be received, sent, or stored upon different types of computer-accessible media, such as non-transitory media, or on similar media separate from the non-transitory computer readable storage medium 820 or the aerial vehicle control system 800. Generally speaking, a non-transitory, computer readable storage medium may include storage media or memory media such as magnetic or optical media, e.g., disk or CD/DVD-ROM, coupled to the aerial vehicle control system 800 via the I/O interface 810. Program instructions and data stored via a non-transitory computer readable storage medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The propulsion mechanism controllers 804 may communicate with the navigation system 808 and adjust the rotational speed, position, orientation, or other parameters of each propulsion mechanism to control and/or stabilize the aerial vehicle, and/or to perform one or more maneuvers and guide the aerial vehicle along a flight path, as described herein.

The navigation system 808 may include a global positioning system (GPS), indoor positioning system (IPS), or other similar system and/or sensors that can be used to navigate the aerial vehicle to and/or from a location. The payload engagement controller 812 communicates with the actuator(s) or motor(s) (e.g., a servo motor) used to engage and/or disengage items.

Vehicle data recorder 814 may be configured to monitor and record data and/or information relating to certain parameters corresponding to the performance and/or operation of the vehicle. Accordingly, vehicle data recorder 814 may comprise and/or communicate with the various sensors associated with the aerial vehicle. For example, vehicle data recorder 814 may be configured to control aspects related to sensing, measuring, monitoring, and/or recording the various components and systems of the aerial vehicle and compiling the recorded data and/or information into flight logs and/or event logs and/or providing the data and/or information to causal fault detection and diagnosis system 300, or various other aspects as described herein. In some example embodiments, vehicle data recorder 814 may be integrated with or form a part of one or more of the processors 802, the propulsion mechanism controllers 804, memory 820, and/or the navigation system 808, or various other systems and/or components.

The network interface 816 may be configured to allow data to be exchanged between the aerial vehicle control system 800, other devices attached to a network, such as other computer systems (e.g., remote computing resources), and/or with aerial vehicle control systems of other aerial vehicles. For example, the network interface 816 may enable wireless communication between the aerial vehicle and an aerial vehicle control system that is implemented on one or more remote computing resources. For wireless communication, an antenna of the aerial vehicle or other communication components may be utilized. As another example, the network interface 816 may enable wireless communication between numerous aerial vehicles. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 818 may, in some implementations, include one or more displays, imaging devices, thermal sensors, infrared sensors, time of flight sensors, inertial measurement units, accelerometers, gyroscopes, wind sensors, pressure sensors, weather sensors, etc. Multiple input/output devices 818 may be present and controlled by the aerial vehicle control system 800.

As shown in FIG. 8, the memory may include program instructions 822, which may be configured to implement the example routines and/or sub-routines described herein. The data storage 824 may include various data stores for maintaining data items that may be provided for controlling aerial vehicles, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 800 is merely illustrative and is not intended to limit the scope of the present disclosure. In particular, the computing system and devices may include any combination of hardware or software that can perform the indicated functions. The aerial vehicle control system 800 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 800. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 800 may be transmitted to the aerial vehicle control system 800 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Figure 9:
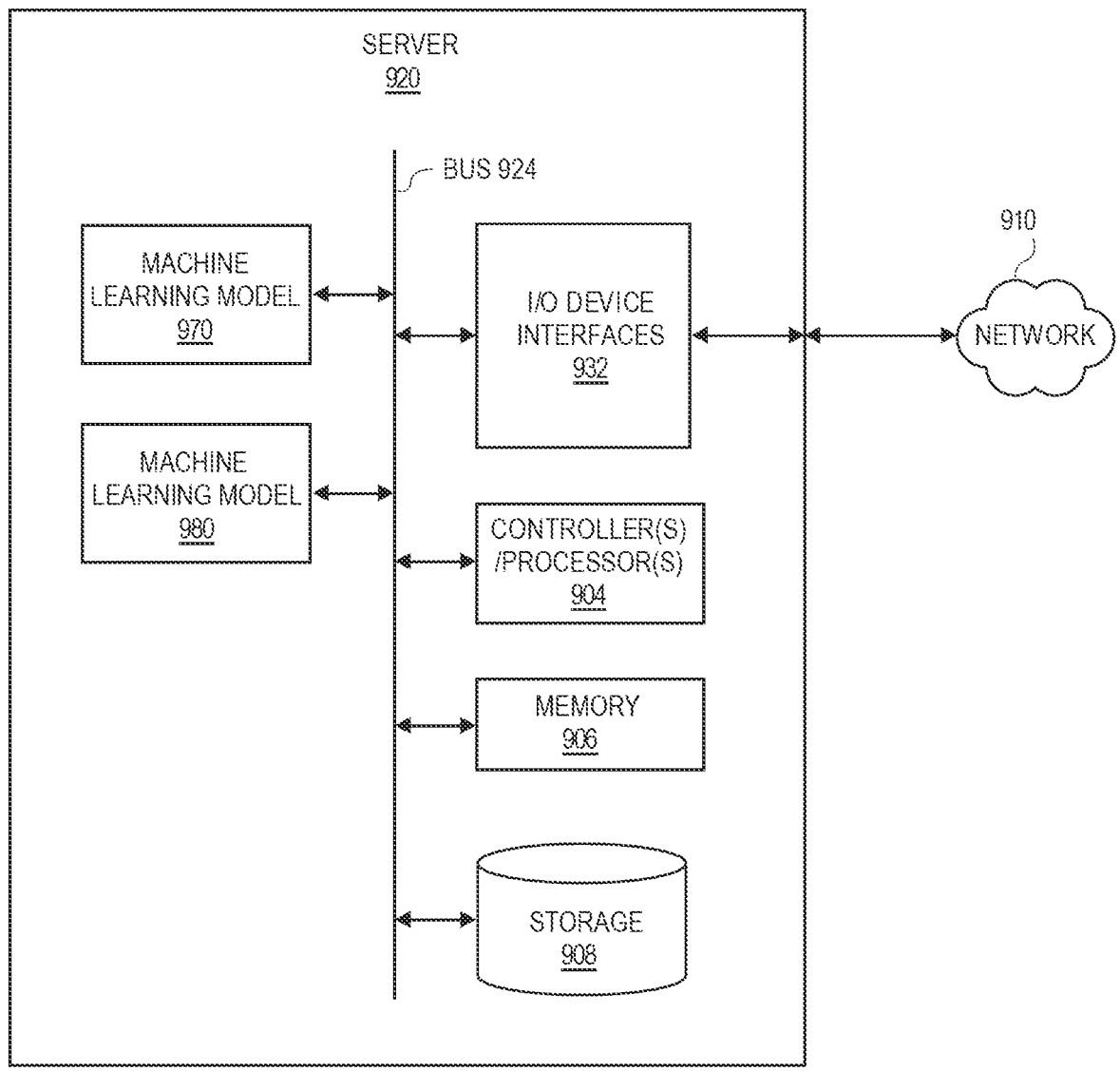
FIG. 9 is a block diagram illustrating various components of a remote computing system, according to embodiments of the present disclosure.

FIG. 9 is a block diagram conceptually illustrating example components of a remote computing system, such as a remote server 920 that may include and/or execute one or more of the machine learning models and/or training of ensembles of models in accordance with described implementations. Multiple such servers 920 may be included in the system, such as one server(s) 920 for each machine learning model. In operation, each of these devices (or groups of devices) may include computer-readable and computer-executable instructions that reside on the respective server(s) 920, as will be discussed further below. According to certain exemplary embodiments, server 920 may represent server 212 as described here.

Each of these server(s) 920 may include one or more controllers/processors 904, that may each include a central processing unit (CPU) for processing data and computer-readable instructions, and a memory 906 for storing data and instructions of the respective device. The memories 906 may individually include volatile random access memory (RAM), non-volatile read only memory (ROM), non-volatile magnetoresistive memory (MRAM) and/or other types of memory. Each server 920 may also include a data storage component 908, for storing data, controller/processor-executable instructions, training data, distilled data samples, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 910 (e.g., the Internet) through respective input/output device interfaces 932.

Computer instructions for operating each server 920 and its various components may be executed by the respective server's controller(s)/processor(s) 904, using the memory 906 as temporary "working" storage at runtime. A server's computer instructions may be stored in a non-transitory manner in non-volatile memory 906, storage 908, or an external device(s). Alternatively, some or all of the executable instructions may be embedded in hardware or firmware on the respective device in addition to or instead of software.

Each server 920 includes input/output device interfaces 932. A variety of components may be connected through the input/output device interfaces. Additionally, each server 920 may include an address/data bus 924 for conveying data among components of the respective server. Each component within a server 920 may also be directly connected to other components in addition to (or instead of) being connected to other components across the server 920.

Each server may also include one or more machine learning models 970 and/or 980 of an ensemble of machine learning models, such as a CNN. As discussed above, the machine learning model 970 and/or 980 may be trained to identify anomalous residuals and/or fault conditions associated with an operation of a vehicle and predict the most likely causes underlying the identified anomalous residuals and/or fault conditions, as described herein.

The components of the server(s) 920, as illustrated in FIG. 9, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and control systems should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
   an unmanned aerial vehicle configured to operate a plurality of missions; and
   a computing system, including:
   one or more processors;
   a memory coupled to the one or more processors and storing program instructions that, when executed by the one or more processors, cause the one or more processors to at least:
   obtain a plurality of parameters associated with an operation of the unmanned aerial vehicle during a first mission of the plurality of missions;
   obtain a plurality of nominal parameter values associated with the operation of the unmanned aerial vehicle, each of the plurality of nominal parameter values corresponding to one of the plurality of parameters;
   compare each of the plurality of parameters against a corresponding nominal parameter from the plurality of nominal parameter values to identify at least one anomalous residual;
   determine that a first anomalous residual of the at least one anomalous residual lies outside a threshold error bound;
   determine at least one first underlying cause associated with the first anomalous residual;
   determine that a second anomalous residual of the at least one anomalous residual lies outside the threshold error bound;
   determine at least one second underlying cause associated with the second anomalous residual; and
   identify a relationship between at least one of:
   the first anomalous residual and the second anomalous residual; or
   the at least one first underlying cause and the at least one second underlying cause.

2. The system of claim 1, wherein identification of the at least one anomalous residual is performed by a trained residuals generator.

3. The system of claim 1, wherein determination of the at least one first underlying cause associated with the first anomalous residual is performed by a trained causal diagnosis engine.

4. The system of claim 1, wherein the plurality of parameters includes at least one parameter associated with an environmental condition such that identification of the at least one anomalous residual is contextual.

5. The system of claim 1, wherein the threshold error bound is determined using at least one of an outlier detection algorithm or a cluster detection algorithm.

6. A method, comprising:
   performing unmanned aerial operation of an unmanned aerial vehicle;
   obtaining a parameter associated with the unmanned aerial vehicle during the unmanned aerial operation of the unmanned aerial vehicle;

obtaining a second parameter associated with the unmanned aerial vehicle during the unmanned aerial operation of the unmanned aerial vehicle;

identifying, using a trained residuals generator, an anomalous residual associated with the parameter;

identifying, using the trained residuals generator, a second anomalous residual associated with the second parameter;

identifying at least one temporal relationship associated with the anomalous residual to determine at least one underlying cause associated with the anomalous residual;

identifying at least one temporal relationship associated with the second anomalous residual to determine at least one second underlying cause associated with the second anomalous residual; and identifying a relationship between at least one of:
the anomalous residual and the second anomalous residual; or
the at least one underlying cause and the at least one second underlying cause.

7. The method of claim 6, further comprising:
determining that the anomalous residual lies outside a threshold error bound.

8. The method of claim 7, wherein at least one of an environmental condition or an operational parameter is marginalized from the plurality of nominal parameters to form a nominal basis of operation associated with the unmanned aerial vehicle.

9. The method of claim 6, further comprising:
generating a fault report including at least one of the anomalous residual or the at least one underlying cause.

10. The method of claim 6, wherein the parameter is obtained in real-time during a mission being performed by the unmanned aerial vehicle.

11. The method of claim 6, further comprising:
obtaining a plurality of mission parameters associated with a mission performed within a first geographic area at a first time;
obtaining a plurality of nominal parameters associated with a nominal mission performed within the first geographic area at the first time; and
providing the plurality of mission parameters and the plurality of nominal parameters as a training input to the trained residuals generator so that the trained residuals generator can identify anomalous residuals.

12. The method of claim 6, wherein the parameter is associated with at least one of:
a propulsion system of the unmanned aerial vehicle;
a control surface of the unmanned aerial vehicle;
a payload system of the unmanned aerial vehicle;
a navigation system of the unmanned aerial vehicle;
a power supply of the unmanned aerial vehicle; or
a structural integrity of the unmanned aerial vehicle.

13. The method of claim 6, wherein the anomalous residual was a previously unknown fault.

14. A method, comprising:
performing a first mission, using a first unmanned aerial vehicle, within a first geographic area at a first time;
obtaining a plurality of first mission parameters associated with an operation of the first unmanned aerial vehicle during the first mission;
performing a second mission, using a second unmanned aerial vehicle within the first geographic area at the first time;
obtaining a plurality of second parameters associated with a second operation of the second unmanned aerial vehicle during the second mission;
providing the plurality of first mission parameters and the plurality of second parameters as a training input to train a residuals generator to identify anomalous residuals;
obtaining a third plurality of parameters associated with an operation of at least one of the first unmanned aerial vehicle, the second unmanned aerial vehicle, or a third unmanned aerial vehicle; and
identifying, using the residuals generator, at least one anomalous residual from the third plurality of parameters.

15. The method of claim 14, further comprising:
determining that the at least one anomalous residual lies outside a threshold error bound; and
determining at least one underlying cause associated with the at least one anomalous residual.

16. The method of claim 15, wherein the threshold error bound is determined using at least one of an outlier detection algorithm or a cluster detection algorithm.

17. The method of claim 14, further comprising:
comparing the plurality of first mission parameters and the plurality of second parameters so as to marginalize at least one of an environmental condition or an operational parameter from the plurality of second parameters to form a nominal basis of operation associated with at least one of the first unmanned aerial vehicle, the second unmanned aerial vehicle, or the third unmanned aerial vehicle.

18. The method of claim 14, wherein the third plurality of parameters includes at least one parameter associated with an environmental condition such that identification of the at least one anomalous residual is contextual.

* * * * *